US007349865B2

(12) United States Patent
Fergusson et al.

(10) Patent No.: US 7,349,865 B2
(45) Date of Patent: Mar. 25, 2008

(54) METHODS AND SYSTEMS FOR MONITORING THE EFFICACY OF A MARKETING PROJECT

(75) Inventors: Scott Fergusson, Fort Wayne, IN (US); Tom Rozman, Edina, MN (US)

(73) Assignee: Investigo Corporation, Edina, MN (US)

( * ) Notice: Subject to any disclaimer, the term of this patent is extended or adjusted under 35 U.S.C. 154(b) by 1306 days.

(21) Appl. No.: 09/916,951

(22) Filed: Jul. 27, 2001

(65) Prior Publication Data

US 2003/0023475 A1    Jan. 30, 2003

(51) Int. Cl.
  *G06F 17/60* (2006.01)
(52) U.S. Cl. ............................... 705/10; 705/7
(58) Field of Classification Search .................. 705/10, 705/7
  See application file for complete search history.

(56) References Cited

U.S. PATENT DOCUMENTS

| | | | | |
|---|---|---|---|---|
| 5,826,243 | A | | 10/1998 | Musmanno et al. ............ 705/35 |
| 5,930,764 | A | * | 7/1999 | Melchione et al. ............ 705/10 |
| 5,940,809 | A | | 8/1999 | Musmanno et al. ............ 705/35 |
| 5,974,396 | A | * | 10/1999 | Anderson et al. .............. 705/10 |
| 5,978,779 | A | | 11/1999 | Stein et al. .................... 705/37 |
| 6,076,072 | A | | 6/2000 | Libman ......................... 705/34 |
| 6,122,635 | A | | 9/2000 | Burakoff et al. ............. 707/102 |
| 6,567,786 | B1 | * | 5/2003 | Bibelnieks et al. ............ 705/14 |
| 6,760,727 | B1 | * | 7/2004 | Schroeder et al. ............. 707/10 |
| 6,829,348 | B1 | * | 12/2004 | Schroeder et al. ...... 379/265.09 |
| 6,925,441 | B1 | * | 8/2005 | Jones et al. .................... 705/10 |
| 2001/0013011 | A1 | * | 8/2001 | Day et al. ...................... 705/14 |
| 2002/0087404 | A1 | * | 7/2002 | Sikey et al. ................... 705/14 |
| 2002/0194050 | A1 | * | 12/2002 | Nabe et al. .................... 705/10 |
| 2003/0009369 | A1 | * | 1/2003 | Gorenstein .................... 705/10 |
| 2003/0055707 | A1 | * | 3/2003 | Busche et al. ................. 705/10 |
| 2003/0208402 | A1 | * | 11/2003 | Bibelnieks et al. ............ 705/14 |
| 2004/0172272 | A1 | * | 9/2004 | Shillinglaw et al. ............ 705/1 |
| 2005/0075946 | A1 | * | 4/2005 | Henning et al. .............. 705/26 |

OTHER PUBLICATIONS

17 CFR Part 248: Gramm-Leach-Bliley Act: Privacy of Consumer Financial Information.*

"Database Marketing Leaves Marketing to the Branches" by Katherine Morrall, Bank Marketing, v 26, n 11, p. 22-30, Nov. 1994.*

(Continued)

*Primary Examiner*—Romain Jeanty
(74) *Attorney, Agent, or Firm*—Crompton, Seager, Tufte; Brian N. Tufte

(57) ABSTRACT

Methods and systems for monitoring the efficacy of a marketing campaign or project. In one embodiment, a customer database stores information about each customer of a firm or business. A number of marketing project parameters are then defined, and run against the information in the customer database to identify those customers that are likely to be interested in a marketed product. The identified customers are notified about the marketed product, preferably through a representative of the firm or business. Then, each sale of the marketed product to the identified customers is recorded. A marketing project efficacy indicator can then be determined by, for example, comparing the number of customers that were notified about the product with the number of customers that actually purchased or did not purchase the product, preferably within a given time period. Preferably, marketing efforts can then be refined based on a timely analysis of the marketing project efficacy.

34 Claims, 16 Drawing Sheets

OTHER PUBLICATIONS

Crosby et al "High performance marketing in the CRM era", Oct. 2001, Marketing Management v10n3 pp. 10-11, Dialog file 15, Accession No. 02239033.*

Nancy R. Mandell, "Online Compliance Help Arrives", *On Wall Street*, Sep. 2001, p. 43.

http://www.portfolioaudit.com/navigatorcg/corpNewsDetail.asp?id=23, "Corporate News-North American Software to Integrate Navigator Consulting Group's Compliance Solution", downloaded Sep. 25, 2001, 2 pages.

http://www.portfolioaudit.com/navigatorcg/corpNewsDetail.asp?id=15, "Corporate News-Navigator Consulting Group Announces portfolioAudit.com Web Site", downloaded Sep. 25, 2001, 1 page.

http://www.portfolioaudit.com/navigatorcg/corpNewsDetail.asp?id=21, "Corporate News-Navigator Consulting Group, Inc. and DataCow of Toronto Announce Development of Portfolio R.A.M. (Research Auditing & Monitor) Software", downloaded Sep. 25, 2001, 2 pages.

http://www.portfolioaudit.com/navigatorcg/corpNewsDetail.asp?id=47, "Corporate News-Portfolio R.A.M. Software Now Available On-Line", downloaded Sep. 25, 2001, 1 page.

http://www.portfolioaudit.com/navigatorcg/corpNewsDetail.asp?id=46, "Corporate News-Navigator Consulting Group Releases brokerAudit Application", downloaded Sep. 25, 2001, 1 page.

http://www.portfolioaudit.com/navigatorcg/corpNewsDetail.asp?id=48, "Corporate News-Securities North America/Complinet Reviews BrokerAudit", downloaded Sep. 25, 2001, 2 pages.

http://www.portfolioaudit.com/navigatorcg/corpNewsDetail.asp?id=52, "Corporate News-MJK Clearing, Inc. and Protegent, Inc. Announce Alliance to offer BrokerAudit™ to MJK Correspondent Broker-Dealers", downloaded Sep. 25, 2001, 2 pages.

http://www.brokeraudit.com/brokeraudit/pubilc/aboutbroker.asp, "BrokerAudit: About US-Highlights", downloaded Sep. 25, 2001, 3 pages.

http://www.mantas.com/solutions/equ_trd_comp.html, "The Mantas Equities Trading Compliance", downloaded Sep. 25, 2001, 2 pages.

http://www.siliconphilly.com/newletters/ar3_6_5.htm, "Mantas; Inc., Announces Funding and Management Team", downloaded Sep. 25, 2001, 7 pages.

http://www.mantas.com/solutions/solutions_advantage.html, "The Mantas Advantage" downloaded Sep. 25, 2001, 1 page.

http://www.mantas.com/solutions/best_execution.html, "Mantas Best Execution", downloaded Sep. 25, 2001, 2 pages.

http://www.mantas.com/solutions/fraud_ml_sec_firms.html, "Fraud and Money Laundering Detection for Securities Firms", downloaded Sep. 25, 2001, 2 pages.

http://www.mantas.com/solutions/solutions_faq.html, "Frequently Asked Questions", downloaded Sep. 25, 2001, 5 pages.

http://www.mantas.com/solutions/solutions_knowledge_disc.html, "The Mantas Knowledge Discovery Platform", downloaded Sep. 25, 2001, 2 pages.

http://www.investrack.com, "Freedom Track, Inc.", downloaded Apr. 30, 2001, 2 pages.

http://www.investrack.com/FT3k_Home.htm, "Freedom Track 3000", downloaded Apr. 30, 2001, 2 pages.

http://www.investrack.com/bd_ria_oversight.htm, "BD RIA Oversight", downloaded Apr. 30, 2001, 2 pages.

http://www.investrack.com/bd_back_office.htm, "BD Back Office", downloaded Apr. 30, 2001, 2 pages.

http://www.investrack.com/ft3k_3rd_generation.htm, "FT3k 3rd Generation", downloaded Apr. 30, 2001, 2 pages.

http://www.sungardss.com/ "SunGard Securities Systems-Home Page", downloaded Apr. 30, 2001, 1 page.

http://www.sungardss.com/html/products.htm, "SunGard Securities Systems, Products", downloaded Apr. 30, 2001, 2 pages.

http://www.sungardss.com/html/eindrad1html, "EinTrader.com-The First Eback-Office Connection", downloaded Apr. 30, 2001, 2 pages.

http://www.sungardss.com/html/p_i_bo.htm, "InTrader-Back Office", downloaded Apr. 30, 2001, 3 pages.

http://www.sungardss.com/htmlp_i_st.htm, "InTrader-Software and Technology", downloaded Apr. 30, 2001, 2 pages.

http://www.sungardss.com/html/p_it_iv.htm, "InTrader-Investment Portfolio", downloaded Apr. 30, 2001, 3 pages.

http://www.sungardss.com/html/p_scs.htm, "SunGard Correspondent Services", downloaded Apr. 30, 2001, 2 pages.

http://www.sungardss.com/html/p_fitrac.htm, "FiTrac for InTrader and BOLT", downloaded Apr. 30, 2001, 2 pages.

http://www.sungardss.com/html/p_ssn.htm, "SunGard Solutions Network (SSN)", downloaded Apr. 30, 2001, 2 pages.

http://www.sungardss.com/html/p_exrpt.htm, "Investment Portfolio-Executive Reporting", downloaded Apr. 30, 2001, 2 pages.

http://www.sungardss.com/html/p_i_fo.htm, "InTrader-Front Office", downloaded Apr. 30, 2001, 3 pages.

http://www.sungardss.com/html/p_i_bd.htm, "InTrader-Broker-Dealer", downloaded Apr. 30, 2001, 3 pages.

http://www.sungardss.com/html/p_i_aa.htm, "InTrader-Alerts and Alarms", downloaded Apr. 30, 2001, 3 pages.

http://www.sungardss.com/html/n_innet.htm, "SunGard Securities System" downloaded Apr. 30, 2001, 1 page.

http://www.sungardss.com/html/p_i_rsm.htm, "InTrader-Remote Systems Management", downloaded Apr. 30, 2001, 2 pages.

http://www.sungardss.com/html/p_ipnet.htm, "SunGard Securities Systems-InTrader Investment Portfolio Services", downloaded Apr. 30, 2001, 2 pages.

http://www.sungardss.com/p_bt_ovr.htm, "BOLT-Overview", downloaded Apr. 30, 2001, 3 pages.

http://www.sungardss.com/html/p_bt_iv.htm, "BOLT-Investment Portfolio", downloaded Apr. 30, 2001, 2 pages.

http://www.sungardss.com/html/p_aps.htm, "SunGard Securities Systems-APS 2", downloaded Apr. 30, 2001, 4 pages.

http://www.advisortoday.com/archives/2001_february_mm.html, Janet C. Arrowood, "Managing Money: Taking the Sting out of an Audit", Feb. 2001, 3 pages.

http://www.finop.com/main.htm, "The FINOP Companies Home Page", downloaded Apr. 30, 2001, 2 pages.

http://www.finop.com/a.htm, "Historical Perspective-The FINOP Companies", downloaded Apr. 30, 2001, 4 pages.

http://www.finop.com/product.htm, "National FINOP, Inc.-A Product Description", downloaded Apr. 30, 2001, 1 page.

http://www.finop.com/tourmenu.htm, "Finop Software 'Tour Menu'", downloaded Apr. 30, 2001, 1 page.

http://www.finop.com/m1.htm, "Access Current Period Trade Processing Files and Reports", downloaded Apr. 30, 2001, 1 page.

http://www.finop.com/m1-a.htm, "Access Trade Processing and Error Reports", downloaded Apr. 30, 2001, 1 page.

http://www.finop.com/m1-a1.htm, "Conventional 'Commissioned Based' Trade Processing", downloaded Apr. 30, 2001, 1 page.

http://www.finop.com/m1-a2.htm, "Process Direct Mutual Fund and Similar Trades:", downloaded Apr. 30, 2001, 1 page.

http://www.finop.com/m1-b.htm, "Trade Status an Error Reports", downloaded Apr. 30, 2001, 1 page.

http://www.finop.com/m1-c.htm, "Error Edit", downloaded Apr. 30, 2001, 1 page.

http://www.finop.com/m2.htm, "Access Current Period Principal (House) and K2I Blotters", downloaded Apr. 30, 2001, 1 page.

http://www.finop.com/m2-a.htm, "Principal Trade Blotters", downloaded Apr. 30, 2001, 1 page.

http://www.finop.com/m2.b.htm, "Principal Trade Blotters", downloaded Apr. 30, 2001, 1 page.

http://www.finop.com/m3.htm, "Access Agency and Riskless Blotters and Reports", downloaded Apr. 30, 2001, 1 page.

http://www.finop.com/m3-a.htm, "Access Agency and Riskless Blotters and Reports", downloaded Apr. 30, 2001, 1 page.

http://www.finop.com/m3-b.htm, "Access Agency and Riskless Blotter and Reports", downloaded Apr. 30, 2001, 1 page.

http://www.finop.com/m3-c.htm, "Access Agency and Riskless Blotter and Reports", downloaded Apr. 30, 2001, 1 page.

http://www.finop.com/m4.htm, "Access Underwriting Files and Reports", downloaded Apr. 30, 2001, 1 page.

http://www.finop.com/m4-a.htm, "Access Underwriting Files and Reports", downloaded Apr. 30, 2001, 1 page.

http://www.finop.com/m4-b.htm, "Access Underwriting Files and Reports", downloaded Apr. 30, 2001, 1 page.
http://www.finop.com/m4-c.htm, "Access Underwriting Files and Reports", downloaded Apr. 30, 2001, 1 page.
http://www.finop.com/m5.htm, "Access Reports From History", downloaded Apr. 30, 2001, 1 page.
http://www.finop.com/m5-a.htm, "Access Reports From History", downloaded Apr. 30, 2001, 1 page.
http://www.finop.com/m5-b.htm, "Access Reports From History", downloaded Apr. 30, 2001, 1 page.
http://www.finop.com/m5-c.htm, "Access Reports From History", downloaded Apr. 30, 2001, 1 page.
http://www.finop.com/m6.htm, "Access System 'Set-Up' Files and Reports", downloaded Apr. 30, 2001, 1 page.
http://www.finop.com/m6-a.htm, "Access System 'Set-Up' Files and Reports", downloaded Apr. 30, 2001, 1 page.
http://www.finop.com/m6-b.htm, "Access Reports From History", downloaded Apr. 30, 2001, 1 page.
http://www.finop.com/m6-c.htm, "Access Reports From History", downloaded Apr. 30, 2001, 1 page.
http://www.finop.com/m8.htm, "Special Applications and User Reports", downloaded Apr. 30, 2001, 1 page.
http://www.finop.com/m10.htm, "Delete Settled Transactions and Append to History", downloaded Apr. 30, 2001, 1 page.
http://www.finop.com/consult.htm, "FINOP Consulting Page", downloaded Apr. 30, 2001, 1 page.

* cited by examiner

Investigo Corp.

Trade Buy Blotter for All for dates 10/1/2000 to 10/31/2000

| Trade Date | Settle Date | Buy/Sell | Account Number | Product | Shares | S/UNS | Buy Price | Buy Cost | Buy Commission |
|---|---|---|---|---|---|---|---|---|---|
| 10/1/2000 | 10/4/2000 | Buy | W632293452 | C017254-0D | 60327.84 | Unsolicited | 1 | 0 | 0 |
| 10/2/2000 | 10/5/2000 | Buy | W632569420 | IALAX | 3603.604 | Solicited | 15.54 | 56000 | 0 |
| 10/2/2000 | 10/5/2000 | Buy | W632569420 | IDGSX | 1689.708 | Solicited | 13.02 | 22000 | 0 |
| 10/2/2000 | 10/5/2000 | Buy | W632569420 | RCVAX | 1756.44 | Solicited | 17.08 | 30000 | 0 |
| 10/2/2000 | 10/5/2000 | Buy | W632567689 | LEIFX | 0.194 | Solicited | 22.5 | 0 | 0 |
| 10/2/2000 | 10/5/2000 | Buy | W632565626 | RCVAX | 51.317 | Solicited | 16.58 | 0 | 0 |
| 10/2/2000 | 10/5/2000 | Buy | W632558555 | RCVBX | 11.081 | Solicited | 16.61 | 0 | 0 |
| 10/2/2000 | 10/5/2000 | Buy | W632568893 | RCVGX | 7.324 | Solicited | 16.57 | 0 | 0 |
| 10/2/2000 | 10/5/2000 | Buy | W632541066 | BETM | 300 | Solicited | 0.4375 | 187.6 | 50 |
| 10/2/2000 | 10/5/2000 | Buy | W632498077 | LEIBX | 0.135 | Solicited | 22.5 | 0 | 0 |
| 10/2/2000 | 10/5/2000 | Buy | W633457411 | GQQ | 70 | Solicited | 98.5 | 6333.44 | 132.09 |
| 10/2/2000 | 10/5/2000 | Buy | W632449502 | RCVGX | 16.242 | Solicited | 16.57 | 0 | 0 |
| 10/2/2000 | 10/5/2000 | Buy | W633047672 | RCVGX | 47.063 | Solicited | 16.57 | 0 | 0 |
| 10/2/2000 | 10/5/2000 | Buy | W632567389 | RCVBX | 21.917 | Solicited | 16.61 | 0 | 0 |
| 10/2/2000 | 10/5/2000 | Buy | W632569420 | OPPAX | 486.784 | Solicited | 69.99 | 34000 | 0 |
| 10/2/2000 | 10/5/2000 | Buy | W632356945 | LEIFX | 1.342 | Solicited | 22.5 | 0 | 0 |
| 10/2/2000 | 10/5/2000 | Buy | W632322475 | RCVAX | 40.796 | Solicited | 16.58 | 0 | 0 |
| 10/2/2000 | 10/5/2000 | Buy | W632312666 | AHTX | 3.706 | Solicited | 12.97 | 0 | 0 |
| 10/2/2000 | 10/5/2000 | Buy | W632300858 | NABGX | 13.93 | Solicited | 15.04 | 0 | 0 |
| 10/2/2000 | 10/5/2000 | Buy | W632297412 | LEIBX | 0.292 | Solicited | 22.5 | 0 | 0 |
| 10/2/2000 | 10/5/2000 | Buy | W632297347 | LEIBX | 0.576 | Solicited | 54.937 | 34.22 | 0 |
| 10/2/2000 | 10/5/2000 | Buy | W632297107 | KO | 0.62 | Solicited | 22.5 | 0 | 0 |
| 10/2/2000 | 10/5/2000 | Buy | W632295523 | DEBX | 17.202 | Solicited | 8.79 | 0 | 0 |

*FIG. 12*

METHODS AND SYSTEMS FOR MONITORING THE EFFICACY OF A MARKETING PROJECT

CROSS-REFERENCE TO CO-PENDING PATENT APPLICATIONS

This Application is related to co-pending U.S. patent application Ser. No. 09/917,120, filed Jul. 27, 2001, entitled "Methods and Systems for Assisting Financial Services Firms and Their Representatives", and U.S. patent application Ser. No. 09/917,447, filed Jul. 27, 2001, entitled "Methods And Systems For Providing A Measure Of Supervision Over The Activities Of Representatives Of A Business", both of which are incorporated herein by reference.

FIELD OF THE INVENTION

The present invention generally relates to marketing campaigns, and more particularly, to methods and systems for monitoring the efficacy of a marketing campaign or project.

BACKGROUND OF THE INVENTION

Marketing campaigns or projects are an essential tool in marketing products and services to customers. In a conventional marketing project, a marketing group or the like identifies characteristics of select customers that might be interested in purchasing a particular product or service. This can be a difficult task, and one that can substantially effect the efficacy of the marketing project. Once the customers of interest are identified, an appropriate medium is selected to reach those customers. For example, if a product is a sport related product, the marketing project may provide advertising in sport related magazines, at sporting related events, or on sports related web sites, to name just a few. Using a direct marketing approach, the customers of interest may be directly contacted through, for example, a direct mailing or a phone call.

Determining the efficacy of a marketing project can be difficult. In many cases, the efficacy of a marketing project is estimated by simply monitoring the overall sales of a product both before and after the marketing project is executed. This, however, only provides a macro view of the merits of the marketing project, and does little to identify ways to improve the marketing project. Also, the efficacy of the marketing project often cannot be determined until well into or after the marketing project is executed, which makes it difficult to assess the efficacy of the marketing project on a short term basis. Also, the ability to provide marketing information to product distributors is hit or miss at best.

SUMMARY OF THE INVENTION

The present invention provides improved methods and systems for monitoring the efficacy of a marketing project. Briefly, and in one illustrative embodiment, the present invention uses a customer database that stores information about each customer of a firm or business. To identify the customers that are likely to be interested in a particular product, a number of marketing project parameters are defined. The marketing project parameters may correspond to, for example, age, income, net worth, investment objectives, hobbies and interests, geographic region, current assets, or any other parameter that may be useful in identifying relevant customers. The marketing project parameters are run against the information in the customer database to identify those customers that fall within the marketing project parameters. Once the customers are identified, the customers can be efficiently marketed to by the marketer.

Once notified, each sale of the product made to the notified customers is recorded in the customer database. A marketing project efficacy indicator can then be determined by, for example, comparing the number of customers that were identified as relevant for the product with the number of those same customers that actually purchased or did not purchase the product, preferably within a given time period. Alternatively, or in addition, a marketing project efficacy indicator may be determined by comparing the revenue generated from the sales of the marketed product relative to a revenue goal. Other methods for calculating a marketing project efficacy indicator include, for example, comparing the number of products sold versus a goal, comparing the value of the products sold versus a goal, etc. The marketing project efficacy indicator can be determined in real or near real time, provided that the sales are recorded in real or near real time. The customer database is preferably a single database, but it may be multiple databases that are local and/or remote, if desired.

It is contemplated that a marketing project may be modified or altered if the marketing project efficacy indicator is deemed to be too low. The marketing project can be modified in any number of ways including, for example, modifying the marketing material that is provided to the customers, modifying the marketing project parameters to select a different set of customers, etc. In addition, by noting the characteristics of the customers that are actually purchasing and/or not purchasing the product, the marketing project parameters can be refined. Once modified, the marketing project can continued to determine if the marketing project efficacy indicator can be improved.

In one illustrative embodiment, the customer database is for a firm that operates through a number of representatives, where each representative has a personal relationship with his or her customers. Such firms include, for example, financial services firms such as broker-dealers, banks, insurance companies, consumer finance organizations, wire houses, etc. While the present invention is primarily described with respect to such firms, it should be recognized that other firms and businesses can benefit from the present invention.

Representatives of such firms, including brokers, insurance agents etc., often lack the time, resources and/or experience necessary to develop an effective marketing campaign or project. Accordingly, in one illustrative embodiment, an internal and/or external marketing group or the like may develop one or more marketing projects for all or selected representatives of a firm or business. In a preferred embodiment, the marketing group has access to the customer database, which includes information about the customers of the firm or business. In some cases, the information in the customer database is entered by the representatives, especially when the customer database is used by the representatives to keep track of and service their customers.

The marketing group may develop a number of marketing project parameters. The marketing project parameters may be selected to identify those customers that are likely to be interested in the marketed product. The marketing project parameters are then run against the customer database(s) to identify those customers that are likely to be interested in the marketed product. In some embodiments, the identified customers are sorted by representative, and personalized listings of identified customers are provided to the representatives. The personalized listings may be offered to the representatives via an interface screen that is used by the representatives to access the customer database(s), if desired.

Since many representatives operate relatively independently, some representative may elect to participate in the marketing project while others may not. In one illustrative embodiment, if the personalized listing of customers is accessed by a representative, the system stores an identifier for each customer in the personalized listing indicating that the customer was notified about the product. The assumption is that if a representative accesses his/her personalized listing of customers, the representative follows through and notifies each of the customers on the personalized listing about the product. Alternatively, customer notification may be identified by monitoring a correspondence history stored in the customer database(s). In this embodiment, the representatives preferably record each correspondence with his/her customers in the customer database, preferably using a contact history interface. By monitoring the correspondence history, either automatically, semi-automatically, or manually, those customers that were actually notified about the product can be identified. A measure of marketing project appeal can be gauged by monitoring how many of the representatives access their personalized listing of customers and/or applicable marketing materials.

To reduce the time and effort required by the representative to participate in the marketing project, the personalized listings may be delivered in a format that aids the representatives in preparing envelopes, post cards, letters, marketing materials, e-mails, etc. For example, the personalized listings may be delivered in a format that is compatible with printing labels, and may include the name and address of each customer on the personalized listings. Preferably, the various fields provided in the personalized listings are extracted from the customer database(s). When so provided, the representatives only need to print the personalized listing on labels, which are then placed on envelopes or post cards for easy delivery. Alternatively, or in addition to, the personalized listings may be provide in a format that is, for example, compatible with printing envelopes or post cards. In this case, the representatives may simply print the name and address of each identified customer directly on an envelope or post card.

To help create personalized letters or marketing materials, the personalized listings may be provided in a format that is compatible with a merge function of an application program such as Microsoft Word®. In this case, the representatives can merge the names, addresses and/or other fields into personalized letters or marketing materials, which can then be distributed to the customers. The personalized listings may be provided in any other suitable format, including for example, a spreadsheet format, an e-mail format, etc.

In some industries, such as the financial services industry, the marketing materials that are sent to customers should be compliant with applicable rules and regulations. To reduce compliance risks, all firms require that every piece of marketing material go though a compliance review. This requirement is particularly burdensome when various sources produce the marketing materials, including in some cases, the representatives themselves. To help reduce this burden, the present invention contemplates having the marketing group or the like generate the marketing material as part of the marketing project, and have the marketing materials reviewed for compliance. Compliant marketing material can then be sent, along with the personalized listing of customers, to selected representatives in the firm. The compliant marketing materials may be compatible with the personalized listing of customers, so that the various fields of the personalized listing can be merged or otherwise incorporated into the compliant marketing material, if desired.

Rather than having the representatives themselves perform the tasks of receiving a personalized listing of customers and generating the personalized envelopes, post cards and/or marketing materials, it is contemplated that the marketing group or the like may perform these tasks for the representatives. For example, the marketing group may generate mailings or the like for all of the identified customers. The mailings may be personalized for each representative, including the appropriate representatives name and address. The marketing group may then forward the mailings to each representative for signature and distribution. Alternatively, the marketing group may distribute the materials directly to the customers (via mail, e-mail, or any other distribution method). This latter alternative may help ensure that each of the identified customers is actually notified about the product. This, in turn, may increase the accuracy of the marketing project efficacy indicator, as no assumption needs to be made about which customers were actually notified.

BRIEF DESCRIPTION OF THE DRAWINGS

FIG. 9 is a screen shot showing the illustrative window of FIG. 8 with the trade menu expanded;

FIG. 11 is a screen shot showing an illustrative window that may be displayed after the "Confirm This Trade" button of FIG. 10 is selected;

FIG. 12 is an illustrative screen shot showing an illustrative Trade Buy Blotter for a firm;

DETAILED DESCRIPTION OF THE INVENTION

The present invention is described below primarily with respect to a Broker Dealer firm. However, the present invention is equally applicable to other financial services firms including banks, insurance companies, consumer finance organizations, wire houses, etc. More generally, the present invention is applicable to any business that maintains a customer database and that records the sales of at least some of its products in a database.

Figure 1:
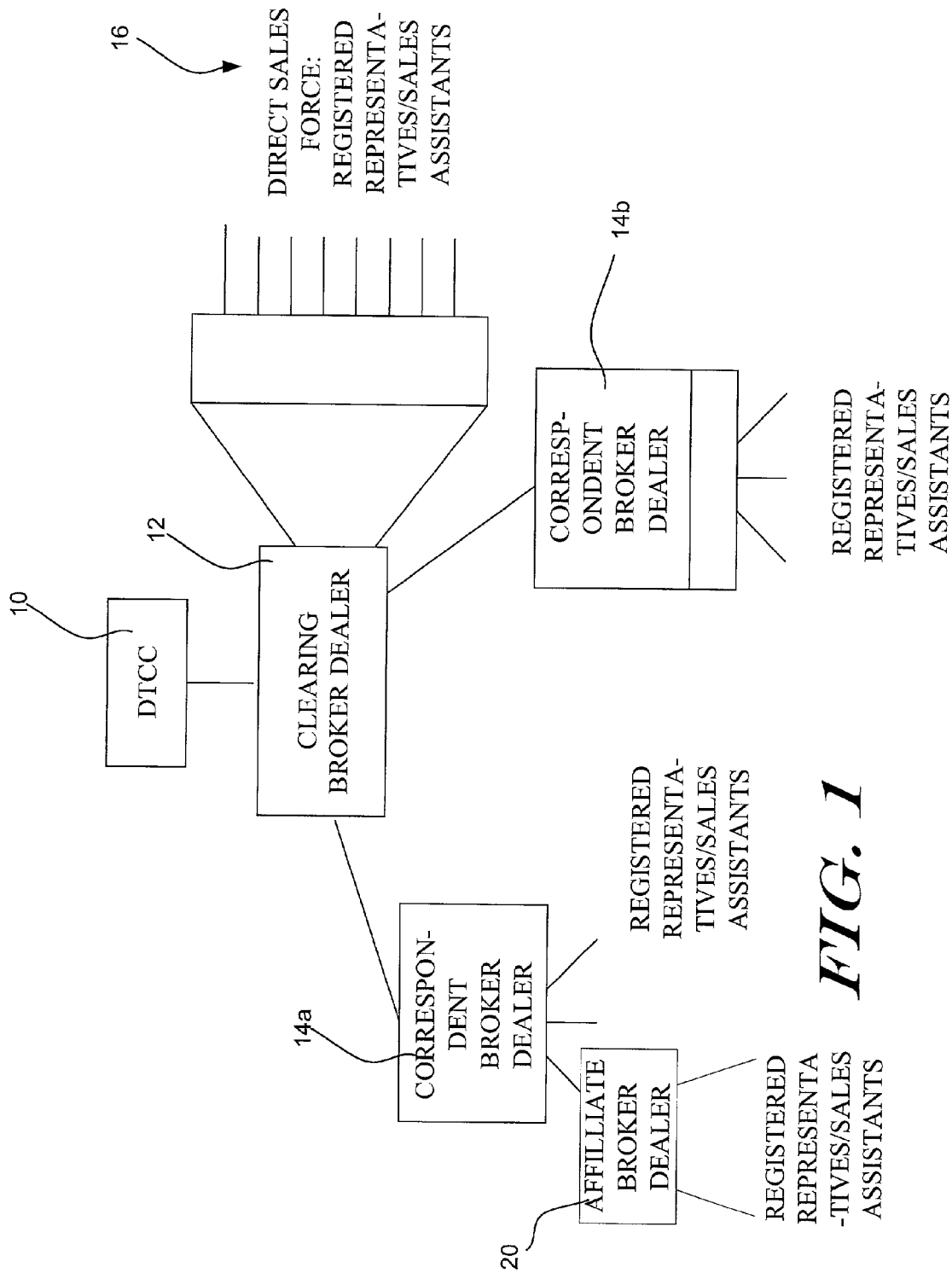
FIG. 1 is a schematic diagram showing the distribution model commonly used in the financial services industry.

FIG. 1 is a schematic diagram showing the distribution model commonly used in the financial services industry to move investment products. The distribution model often begins with the DTCC (Depository Trust Clearing Corporation—formerly NSCC) 10. The DTCC clears a majority of the investment market's equity, debt and mutual fund trades, and also some industry insurance transactions. Financial services who transact business through the DTCC 10, must either be a Clearing Broker Dealer 12 or a correspondent 14 to a Clearing Broker Dealer. Clearing Broker Dealers 12 generally have systems that facilitate trading with the DTCC 10.

The Clearing Broker Dealers 12 may have their own direct sales force, which often includes registered representatives and sales assistants 16 that sell investment product directly to customers. The Clearing Broker Dealers 12 may also have a number of Correspondent Broker Dealers 14a and 14b. Each Correspondent Broker Dealer 14a and 14b may have a number of registered representatives and sales assistants to sell investment product to their customers. Some of the Correspondent Broker Dealers 14 may have Affiliate Broker Dealers, such as Affiliate Broker Dealer 20, which may also have registered representatives and sales assistants for selling investment product to their customers.

Figure 2:
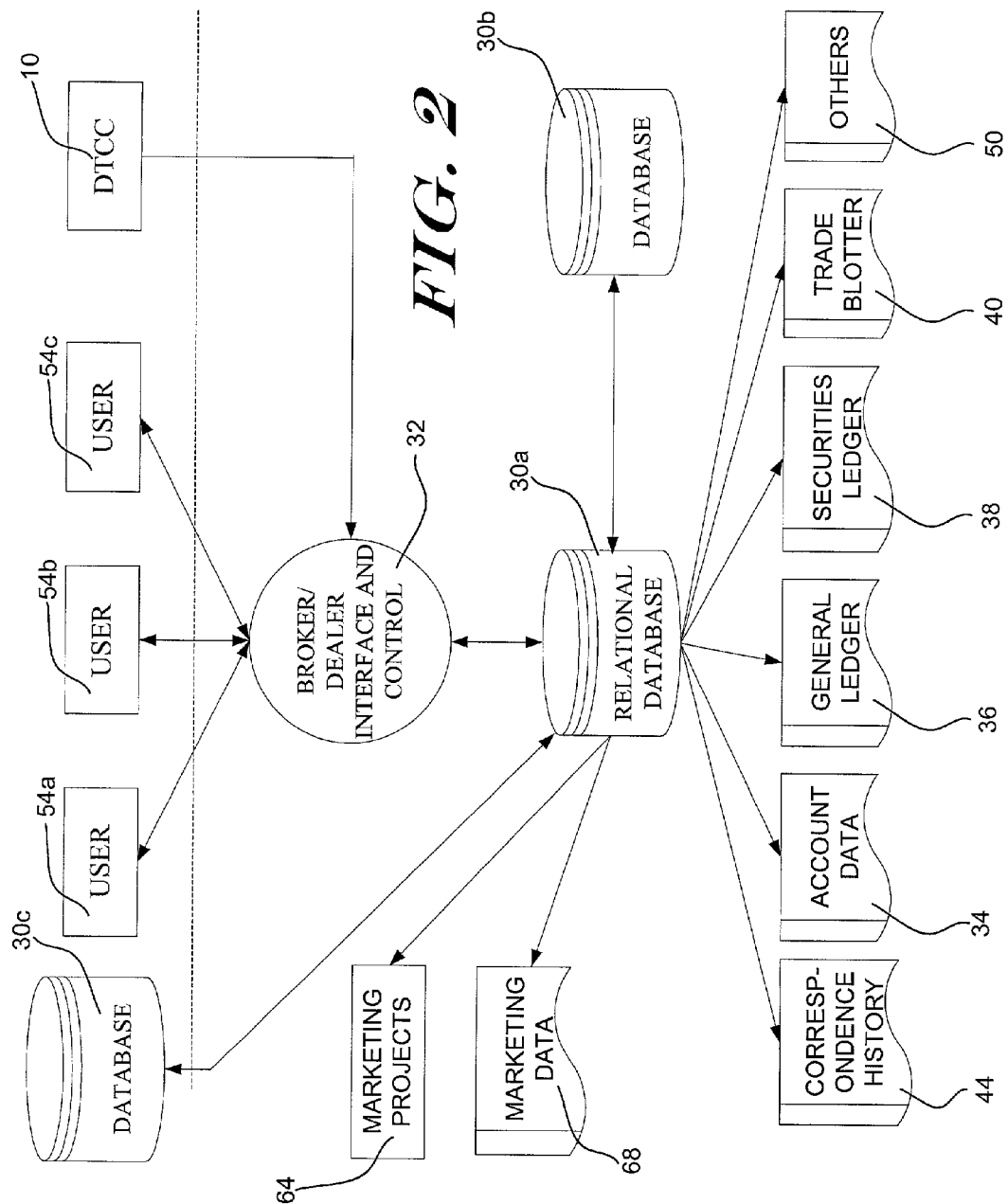
FIG. 2 is a schematic diagram showing the basic architecture of an illustrative embodiment of the present invention.

FIG. 2 is a schematic diagram showing the basic architecture of one illustrative embodiment of the present invention. The illustrative embodiment is preferably used in conjunction with financial services firms such as Clearing Broker Dealers 12, Correspondent Broker Dealers 14a and 14b, Affiliate Broker Dealers 20 (see FIG. 1), or other financial services firms involved in the creation, management, distribution and/or marketing of financial products or services.

The illustrative system uses a database 30a, which is preferably a relational database such as a Microsoft Access®, Microsoft SQL Server 2000®, Oracle 9i®, etc. In some embodiments, the system may also access other databases, such as databases 30b and 30c. Database 30b is shown as another local database, and database 30c is shown as a remote database. Multiple local and/or remote databases may be used by the system, if desired.

A broker/dealer interface and control block 32 provides an interface between the database 30a-c and the users 54A, 54B, and 54C. The users 54A, 54B, and 54C may be any type of user, but in the illustrative embodiment, are registered representatives and/or sales assistants. In a preferred embodiment, the broker/dealer interfacing control block 32 and database 30a are executed on one or more server system. The one or more server systems can then be connected to a number of client systems via the World Wide Web (WWW). The users 54A, 54B and 54C may access the broker/dealer interface and control block 32 using the client systems via the WWW. This architecture is illustrated by dashed line 60. The server functions are shown below dashed line 60, and the client functions are shown above dashed line 60. While users 54A, 54B and 54C may access the broker/dealer interface and control block 32 via the WWW, other connection mechanisms are contemplated. For example, the users 54A, 54B and 54C may access the broker/dealer interface control block 32 through an intranet, a LAN, a direct connection, or any other connection mechanism or means. To receive pricing data and to clear trades, the broker/dealer interface and control block 32 may be connected to the DTCC 10 and/or other services. It is contemplated that these connections may also be via the WWW, an intranet, a LAN, a direct connection, or any other connection mechanisms.

In the illustrative embodiment, the database 30a includes a number of data files (or entries) to support the activities of users 54A, 54B and 54C. In some embodiments, some of these data files and/or additional data files are provided in databases 30b and 30c. Some illustrative data files (or entries) include customer account data 34, general ledger data 36, securities ledger data 38, trade blotter data 40, customer correspondence history logs 44, and others 50. The account data file 34 preferably identifies each customer account, and the contents of each account. A customer account may include, for example, a customer account number, current and past holdings of the account, investment objectives of the account, net worth, personal information about the customer including the customer's name, address, age, interests, etc. The general ledger data file 36 preferably stores a general ledger for the broker dealer firm. The securities ledger 38 preferable records each buy and sell executed by representatives of the broker dealer firm. The trade blotter data file 40 preferably stores each trade executed by representatives of the broker dealer firm. The correspondence history data file 44 preferably records the correspondence history between each representative and their customers.

To identify the customers that are likely to be interested in a particular product, one or more marketing projects 64 may be defined, preferably by a marketing group of the like. Each marketing project 64 may have one or more marketing project parameters associated therewith. The marketing project parameters may correspond to, for example, age, income, net worth, investment objectives, current investment holdings, hobbies and interests, geographic region, and/or any other parameter that may be helpful in identify relevant customers. The marketing project parameters are preferably part of the marketing data file 68, which in the illustrative embodiment, is stored in database 30a.

Once defined, and in the illustrative embodiment, the marketing project parameters may be run against the information in the database 30a to identify selected customers. Once identified, the customers may be sorted by user 54a, 54b and 54c, if desired, and a personalized listing of identified customers can be provided to each user 54a, 54b and 54c. The personalized listing can be offered to each user 54a, 54b and 54c via the Broker/Dealer Interface and Control Block 32, if desired.

Since many of the users 54a, 54b and 54c may operate relatively independently of each other and of the firm or business, some users 54a, 54b and 54c may elect to participate in the marketing project while others may not. In one embodiment, if the personalized listing of customers is accessed by a user 54a, 54b and 54c, the system stores an identifier for each customer listed in the personalized listing. The identifier indicating that the customer was notified about the product. In this embodiment, the assumption is that if a user 54a, 54b and 54c accesses his/her personalized listing of customers, the user 54a, 54b and 54c follows through and notifies each of his/her customers about the product. Alternatively, customer notification may be tracked by monitoring a correspondence history stored in the customer database 30a. The representatives preferably record each correspondence between the representative and his/her customers in the customer database, preferably using the contact history interface shown in FIG. 8. By monitoring the correspondences, either automatically, semi-automatically, or manually, those customers that were actually notified about the product can be identified. In either case, a marketing appeal indicator of the marketing project 64 can be gauged by monitoring how many of the users 54a, 54b and 54c (e.g. representatives) access their personalized listing of customers and/or applicable marketing materials.

Once the customers are notified, each sale of the product to one of the notified customers may be recorded in the customer database, preferably by users 54a, 54b and 54c. A marketing project efficacy indicator can then be determined by, for example, comparing the number of customers that were notified about the product with the number of the same customers that actually purchased or did not purchase the product, preferably within a given time period. Alternatively, or in addition, the marketing project efficacy indicator may be determined by comparing the revenue generated from the sales of the marketed product relative to a revenue goal. Other methods for calculating a marketing project efficacy indicator are also contemplated including, for example, comparing the number of products sold versus a sales goal, comparing the value of the products sold versus a value goal, etc. The marketing project efficacy indicator can be determined in real or near real time, provided that the sales are recorded in real or near real time by users 54a, 54b and 54c.

It is contemplated that the marketing project 64 may be modified or altered if the marketing project efficacy indicator is deemed to be too low. The marketing project can be modified in any number of ways including, for example, modifying the marketing material that is provided to the customers, modifying the marketing project parameters to select a different set of customers, etc. In addition, by noting the characteristics of the customers that are actually purchasing or not purchasing the product, the marketing project parameters can be refined. Once modified, marketing project 64 can be repeated to determine if the marketing project efficacy indicator can be improved.

Figure 3:
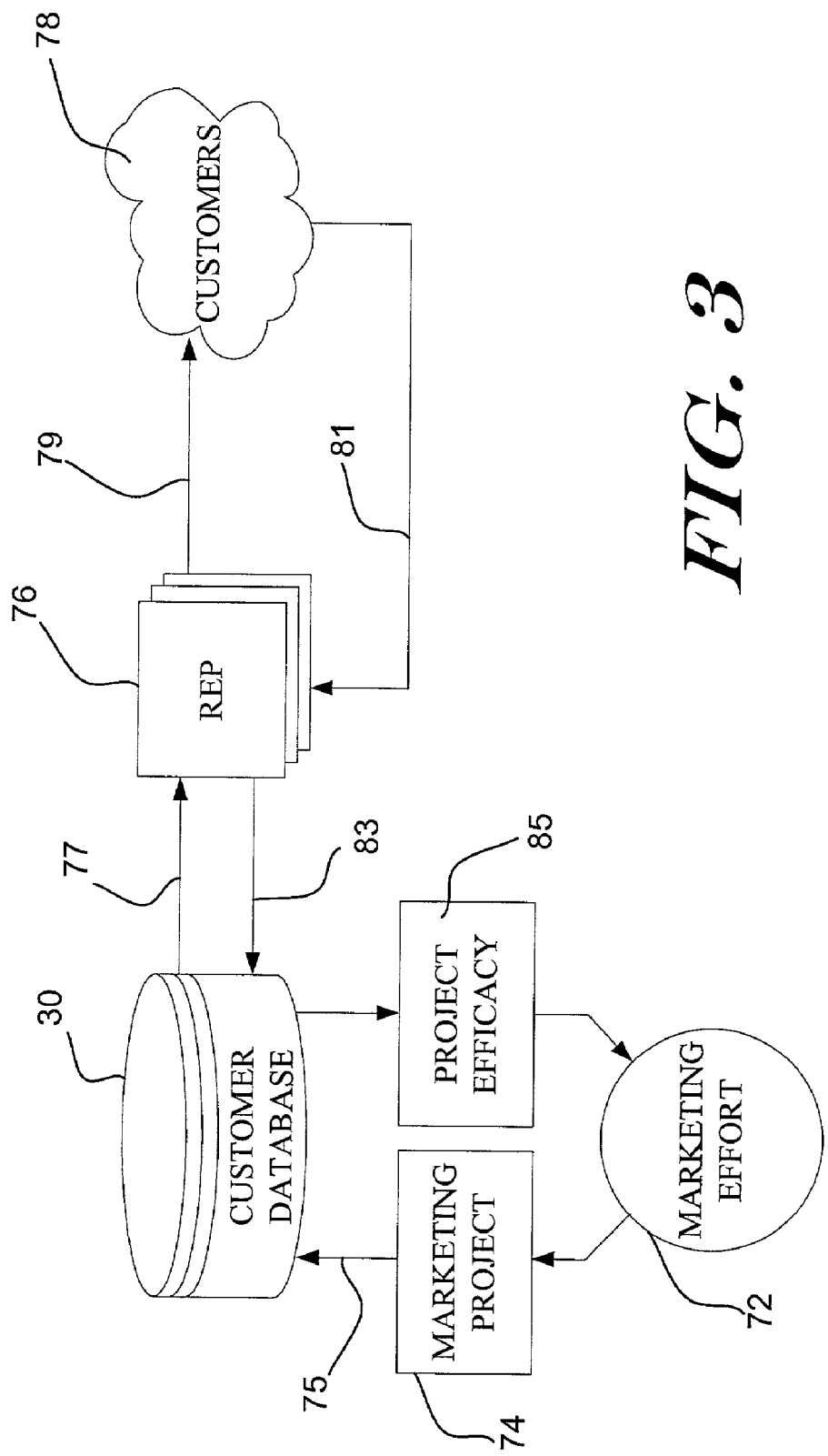
FIG. 3 is a schematic diagram showing the basic operation of an illustrative embodiment of the present invention.

FIG. 3 is a schematic diagram showing the basic operation of one illustrative embodiment of the present invention. The process begins when a marketing department or group 72 defines a marketing project 74. The marketing project 74 preferably includes one or more marketing project parameters. The marketing project parameters are preferably chosen to help identify those customers that are likely to be interested in a particular product of interest. In one example, the marketing project parameters correspond to age, income, net worth, investment objectives, current holdings, hobbies and interests, geographic region, and/or any other parameter that may be helpful in identify relevant customers for a product of interest. The marketing project parameters preferably correspond to or can be derived from one or more of the data fields in the customer database 30a.

Once defined, and in the illustrative embodiment, the marketing project parameters are run against the information in the customer database 30a to identify selected customers, as illustrated by line 75. A personalized listing of identified customers can then be provided to each representative 76, as indicated by line 77. Some of the representatives 76 may elect to participate in the marketing project 74 while others may not. In one embodiment, if the personalized listing of customers is accessed by the representative 76, the system stores an identifier in the customer database 30a indicating that each customer in the personalized listing was notified about the product. A marketing appeal indicator (not shown) of the marketing project 74 can be gauged by, for example, monitoring how many of the representatives 76 accessed their personalized listing of customers and/or applicable marketing materials.

Armed with their personalized listing of customers, each representative 76 may notify his/her customers 78 about the product of interest, as indicated by line 79. Once notified, some of the customers 78 will contact the representative 76 and inquire about the product, and some will actually purchase the product, as indicated by line 81. Each sale of the product is preferably recorded in the customer database 30a, as shown by line 83. A marketing project efficacy indicator 85 can then be determined by, for example, comparing the number of customers that were notified about the product with the number of those customers that actually purchased or did not purchase the product, preferably within a given time period. Alternatively, or in addition, the marketing project efficacy indicator 85 may be determined by comparing the revenue generated from the sales of the marketed product relative to a revenue goal. Other methods for calculating the marketing project efficacy indicator 85 may include, for example, comparing the number of products sold versus a sales goal, comparing the value of the products sold versus a value goal, etc. The marketing project efficacy indicator 85 can be determined in real or near real time, provided the sales are recorded in real or near real time by the representative 76.

It is contemplated that each marketing project 74 may be modified or altered if the marketing project efficacy indicator 85 is deemed to be too low. Each marketing project 74 may be modified in any number of ways including, for example, modifying the marketing material that is provided to the customers 78, modifying the marketing project parameters to select a different set of customers 78, etc. In addition, by noting the characteristics of the customers 78 that are actually purchasing and/or not purchasing the product, the marketing project parameters may be refined. Once modified, the marketing project 74 can be restarted to determine if the marketing project efficacy indicator 85 can be improved.

Figure 4:
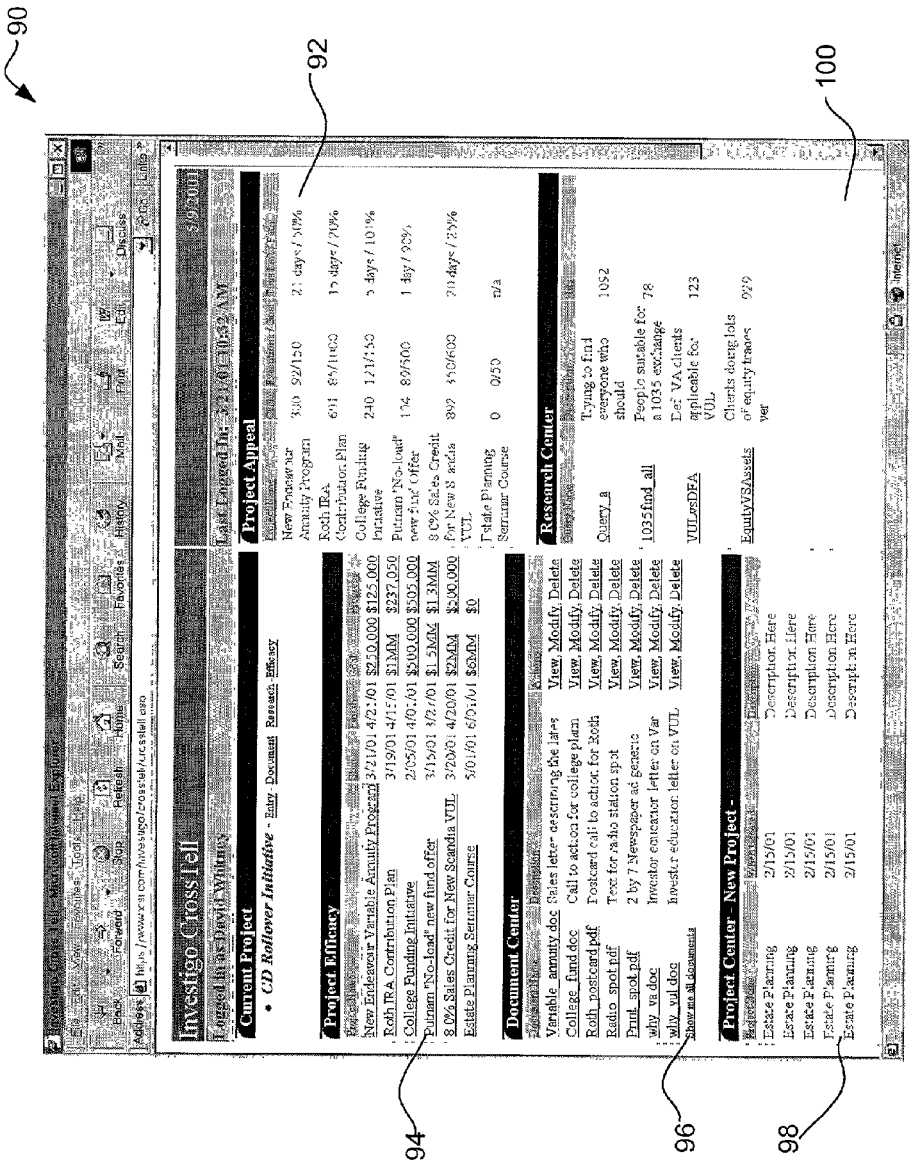
FIG. 4 is a screen shot showing an illustrative window that may be used by a firm or business to assist in managing various marketing projects.

FIG. 4 is a screen shot showing an illustrative window that may be used by a firm or business to assist in managing various marketing projects. The window is generally shown at 90, and includes a Project Appeal Region 92, a Project Efficacy Region 94, a Document Center Region 96, a New Project Center Region 98 and a Research Center Region 100. The Project Appeal region 92 and the Project Efficacy Region 94 each have six illustrative marketing projects that are underway.

The Project Appeal Region 92 has several columns, including a marketing project name column, a "clicks" column, an Executions/Goal column, and a Time Left/Path column. The marketing project name column identifies each of the marketing projects, preferably using a descriptive name. For example, the first marketing project listed in the Project Appeal Region 92 includes the descriptive name "New Endeavor Annuity Program". The "clicks" column in the Project Appeal Region 92 identifies the number of representatives that "clicked" on an announcement notice that was sent to each of the representatives announcing the availability of the marketing project, as further described below. For the "New Endeavor Annuity Program", three-hundred and eighty (380) representatives "clicked" on the announcement notice, indicating considerable initial interest in the marketing project. The Execution/Goal column identifies the number of representatives that actually elected to participate in the marketing project, along with a goal. For the "New Endeavor Annuity Program", ninety-two (92) representatives actually elected to participate in the marketing project, with a goal of 150 representatives.

Finally, the Time Left/Path column identifies the time left in the marketing project (in days), along with the percentage of revenues that have been generated relative to a revenue goal. For the "New Endeavor Annuity Program", 21 days are left in the marketing project, with 50% of the revenue goal reached. The clicks, Execution/Goal, and to some extend Time Left/Path columns of the Project Appeal Region 92 can be used to determine a measure of the project appeal of the marketing project. For example, if very few representatives "click" on the announcement notice announcing the marketing project, there is likely little project appeal for the marketing project. Likewise, if a significant number of representatives "click" on the announcement notice, but few representatives actually elect to participate in the marketing project, there is likely little project appeal for the marketing project. A number of steps can be taken if the project appeal is less than desired. For example, the marketing group may provide a more effective announcement notice to increase the number or "clicks". The marketing group may also display more effective promotional material when the representative actually "clicks" on the announcement notice. The marketing group may also target different customers, re-introduce the marketing project in a different geographical region, etc., preferably using system based representative feedback.

Like the Project Appeal region 92, the Project Efficacy Region 94 has several columns, including a Start Date column, a Finish Date column, a revenue Goal column, and a revenue Progress column. The Start Date column is used to indicate when the marketing project was initiated. The Finish Date column is used to indicate when the marketing project will terminate. The Revenue Goal column indicates a revenue goal that may be set by the marketing group or the like when the marketing project is initiated. The revenue Progress column indicates the revenue that has been generated by the marketing project to date. The revenue Progress is preferably calculated by summing the revenue generated on each sale of the product of interest to those customers that were notified about the product under the marketing project.

A measure of project efficacy can be determined by noting the revenue progress, the revenue goal, and the time remaining in the marketing project. A measure of project efficacy can also be determined by examining the Time Left/Path column of the Project Appeal Region 92. As discussed above, the Time Left/Path column of the Project Appeal Region 92 identifies the time left in the marketing project (in days), along with the percent of revenue that has been generated relative to the revenue goal—the revenue goal being displayed in the Revenue Goal column of the Project Efficacy Region 94.

The Document Center 96 preferably displays marketing materials that are generated for the various marketing projects. As indicated above, in some industries the marketing materials that are sent to customers should be compliant with applicable rules and regulations. To reduce compliance risks, many firms require that every piece of marketing material go though a compliance review. To help reduce this burden, the present invention contemplates having the marketing group or the like generate the marketing material as part of the marketing project, and have the marketing materials reviewed for compliance before the materials are sending to the representatives. As noted above, compliant marketing material can be sent, sometimes along with a personalized listing of customers, to each of the representatives in the firm. The Document Center 96 preferably displays the various document that are either under construction or completed.

The New Project Center 98 is used to reference marketing projects that are currently under development, and the Research Center 100 is used to reference queries that are under development. The various queries in the Research Center 100 are preferably designed and tested to select a specific targeted group of customers from the customer database 30*a*.

Figure 5:
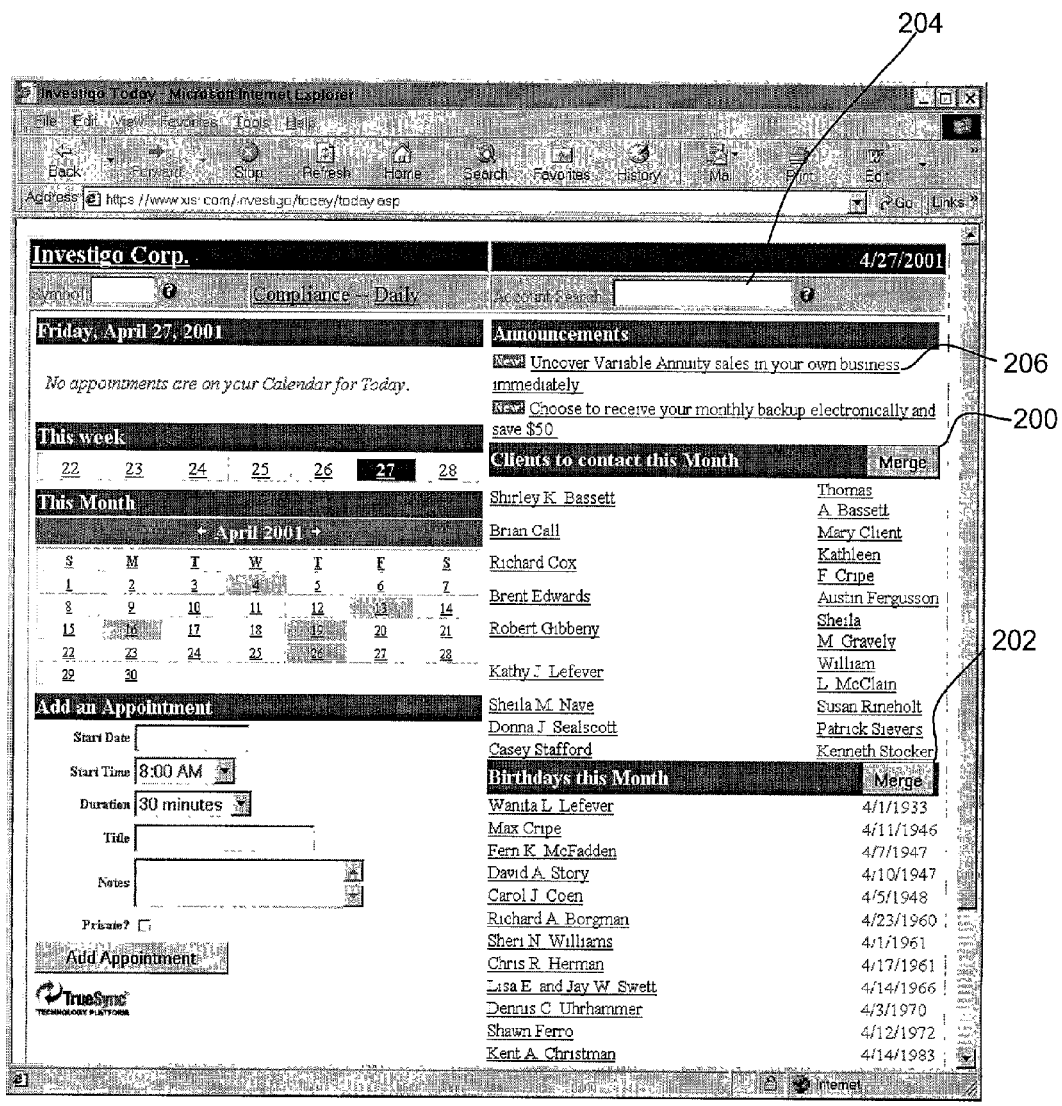
FIG. 5 is a screen shot showing an illustrative window that may be displayed when a representative accesses the customer database system.

FIG. 5 is a screen shot showing an illustrative window that may be displayed when a representative accesses the customer database 30*a*. The illustrative window is preferably personalized for each representative. The illustrative window may include, for example, a personalized calendaring function that allows the representative to schedule appointments and generally keep track of his/her current and future activities. The illustrative window also may display a listing of all of the customers of the representative that should be contacted in the current month. Some customers may wish to be contacted every month or every quarter, and the system may track when each customer should be contacted next. A merge function 200 may be coupled to this function so that the representative can easily contact each of the listed customers. The illustrative window may also display those customers that have a birthday in the current month. Both the name and birthday are displayed on the screen. A merge function 202 may also be provided for easily contacting each of the customers that have a birthday in the current month.

Beyond these functions, the illustrative window of FIG. 5 may also have an Announcements Region 206. The Announcement Region 206 may provide personalized announcements to each representative. For example, when a marketing project is launched, as described above, an announcement notice may be provided in the Announcement Region 206 for those representatives that have one or more customers that are likely to be interested in the marketed product. In the illustrative embodiment, each of the announcement notices are in the form of a hyperlink, such as the "Uncover Variable Annuity sales in your own Business immediately" hyperlink. Some of the representatives will "click" on one or more the hyperlinks in the Announcement Region 206. It is these "clicks" that may be counted and displayed in the "clicks" column of the Project Appeal Region 92 of FIG. 4. In a preferred embodiment, the Announcements Region 206 may be called the "Business Builders" region 206, but this is not required.

Figure 6:
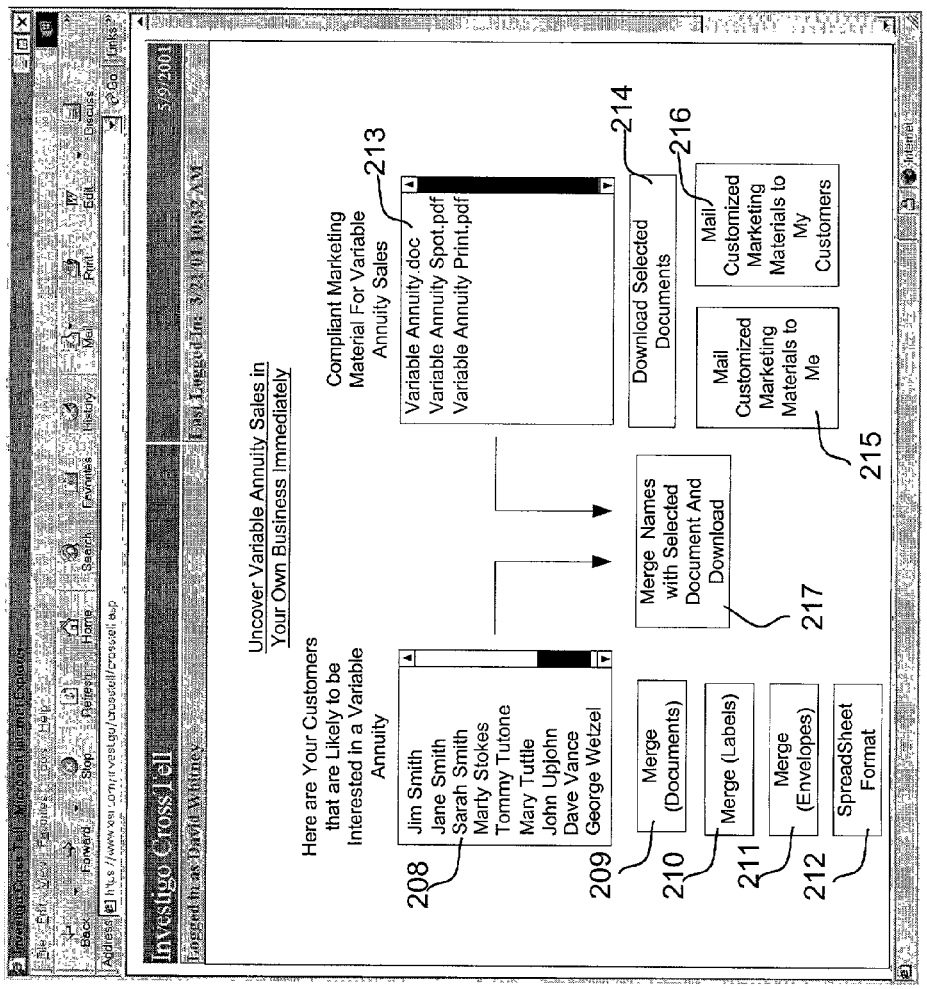
FIG. 6 is a screen shot showing an illustrative window that may be displayed when a representative selects the "Uncover Variable Annuity sales in your own Business immediately" announcement notice in the Announcements region of FIG. 5.

FIG. 6 is a screen shot showing an illustrative window that may be displayed when a representative "clicks" on the "Uncover Variable Annuity sales in your own Business immediately" hyperlink in the Announcements Region 206 of FIG. 5. The illustrative window of FIG. 6 is designed to make it easy for a representative to participate in the marketing project. As indicated above, a marketing group or the like preferably develops a number of marketing project parameters, which are run against the customer database 30*a* to identify those customers that are likely to be interested in the marketed product. In the illustrative embodiment, the identified customers are sorted by representative and a personalized listing of identified customers is provided to each representative of the firm. The dialog box 208 shows the personalized listing of customers for one of the representatives.

To reduce the time and effort required by each representative to participate in the marketing project, the personalized listing may be delivered to the representative, preferably upon request, in a format that aids the representative in preparing envelopes, post cards, letters, marketing materials, e-mails, etc. For example, to help create personalized letters or marketing materials, the personalized listing may be provided in a format that is compatible with a merge function of an application program such as Microsoft Word®. In this format, the representative can merge the names, addresses and/or other fields into personalized letters or marketing materials. In the illustrative embodiment, button 209 can be used to downloaded the personalized listing of customers in a merge format that is compatible with an application program such as Microsoft Word®.

The personalized listing may also be provided in a format that is compatible with a spreadsheet application program, an e-mail program, or other suitable format, if desired. In the illustrative embodiment, buttons 210, 211 and 212 may be used to download the personalized listing of customers in a format that is compatible with labels, envelopes, and a spreadsheet program, respectively. Other formats are also contemplated.

As indicated above, the marketing group may generate compliant marketing material as part of the marketing project. Compliant marketing material can then be provided, sometimes along with the personalized listing of customers, to each of the representatives in the firm. The dialog box 213 of FIG. 6 displays various compliant marketing documents that have been developed for the "Uncover Variable Annuity sales in your own Business immediately" marketing project. The representative may download any of these documents via button 214.

It is contemplated that the compliant marketing materials may be compatible with the personalized listing of customers, so that the various fields of the personalized listing of customers can be merged or otherwise incorporated into the compliant marketing material, if desired. In one embodiment, the representative may merge the various documents after they are downloaded. In another embodiment, a representative may simply select certain compliant marketing materials and have the personalized listing of names merged with the marketing material before they are downloaded to the representative. This can be accomplished by using button 217.

Rather than having the representatives perform the tasks of receiving the personalized listing of customers, and generating the personalized envelopes, post cards and/or compliant marketing materials, it is contemplated that the marketing group may perform these tasks for the representatives, preferably upon request. For example, the marketing group may generate mailings for all of the identified customers. The mailings may be personalized for each representative, including the appropriate representatives name and address. The marketing group may then forward the mailings to each representative for signature and mailing. The representative may request this option by selecting button 215. Alternatively, the marketing group may distribute the materials directly to the customers. The representative may request this option by selecting button 216.

Figure 7:
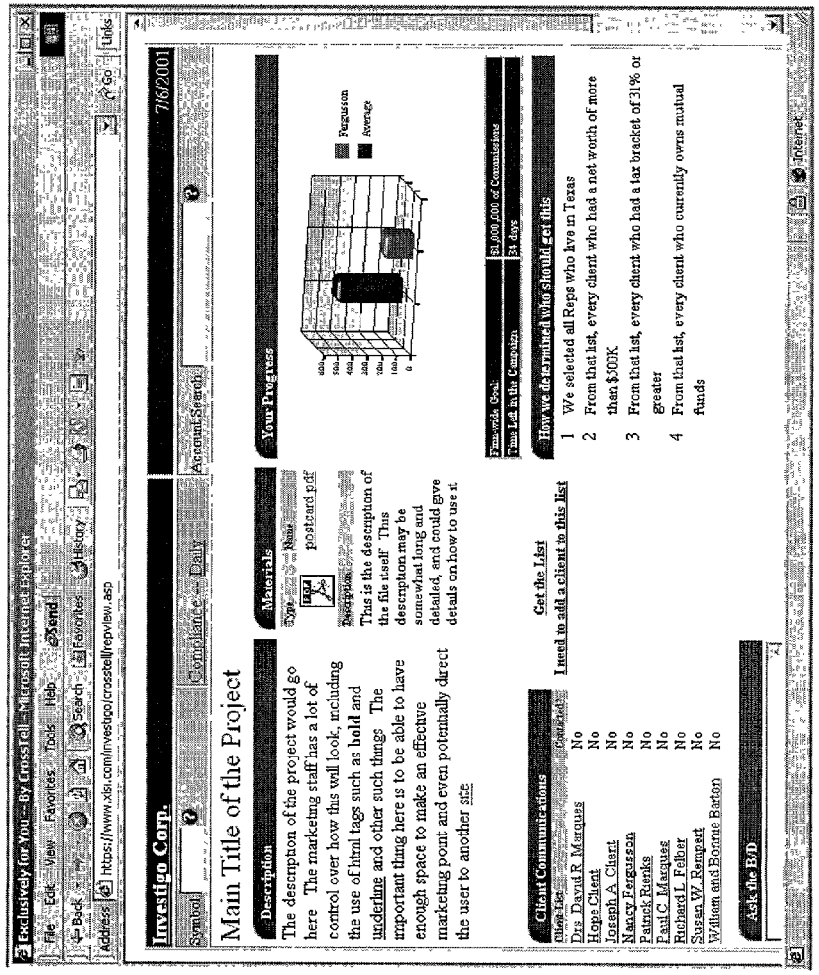
FIG. 7 is a screen shot showing an another illustrative window that may be displayed when a representative selects one of the hyperlinks in the Announcements region of FIG. 5.

FIG. 7 is a screen shot showing another illustrative window that may be displayed when a representative "clicks" on the one of the hyperlink in the Announcements Region 206 of FIG. 5. The illustrative window includes, for example, a "Main Title of the Project" Region along the top bar, a "Description" Region, a "Client Communications" Region, a "Materials" Region, a "Your Progress" Region and a "How We Determined Who Should Get This" Region as shown. Other regions may also be provided, as desired.

The "Main Title of the Project" Region preferably includes the title of the marketing project, and preferably corresponds to one of the hyperlinks in the Announcements Region 206 of FIG. 5. The "Description" Region preferably includes a description of the marketing project. The description is preferably written by the marketing group to make an effective marketing presentation to the representatives, which may increase the marketing project appeal for the representatives.

The "Client Communications" Region may include a personalized listing of customers for the particular representative. As described above, the personalized listing of customers is preferably generated by running the marketing project parameters against the customer database. An entry, shown to the right of each listed customer, may be provided that identifies which of the listed customers have already been contacted by the representative regarding the marketed product. In the illustrative embodiment, none of the listed customers has been contacted.

The "Client Communications" Region may also include a "Get the List" of customers hyperlink, which in the illustrative embodiment, may provide the personalized listing of customers to the representative in a format that is compatible with, for example, a merge function of an application program such as Microsoft Word®, or any other suitable format. The "I need to add a client to the list" hyperlink is also be provided, which may allow the representative to add a customer to the personalized listing, if desired.

The "Materials" Region preferably includes a link to pre-generated rules compliant marketing material. As indicated above, the rules compliant marketing material may be generated by the marketing group or the like, and is preferably checked for compliance with applicable rules. The rules compliant marketing materials may be compatible with the personalized listing of customers, if desired, so that the various fields of the personalized listing can be merged or otherwise incorporated into the compliant marketing material.

The "Your Progress" Region displays the representatives progress relative to, for example, the average progress of other representatives. This allows the representative to track his or her progress against other representatives, and may provide added incentive or motivation to contact the customers identified on his/her personalized listing of customers. The "How We Determined Who Should Get This" Region identifies the parameters used to generate the personalized listing of customers. It should be recognized that the various regions shown in FIG. 7 are only illustrative, and that other regions may be provided if desired.

Contact with the customers is preferably tracked either through efforts of the marketing group, or by monitoring the correspondence history data file 44 of FIG. 2. The representative preferably record each correspondence between the representative and his/her customers, preferably using the contact history region described more fully below with respect to FIG. 8. By monitoring these correspondences, either automatically, semi-automatically, or manually, those customers that were actually notified about the product can be identified.

As noted above, each sale of the product made to one of the notified customers is preferably recorded in the customer database 30a. A marketing project efficacy indicator can be determined by, for example, comparing the number of customers that were notified about the product with the number of those same customers that actually purchased or did not purchase the product. FIGS. 8-12 illustrate a system that can be used by the representatives to record their sales of the product in real or near real time.

Figure 8:
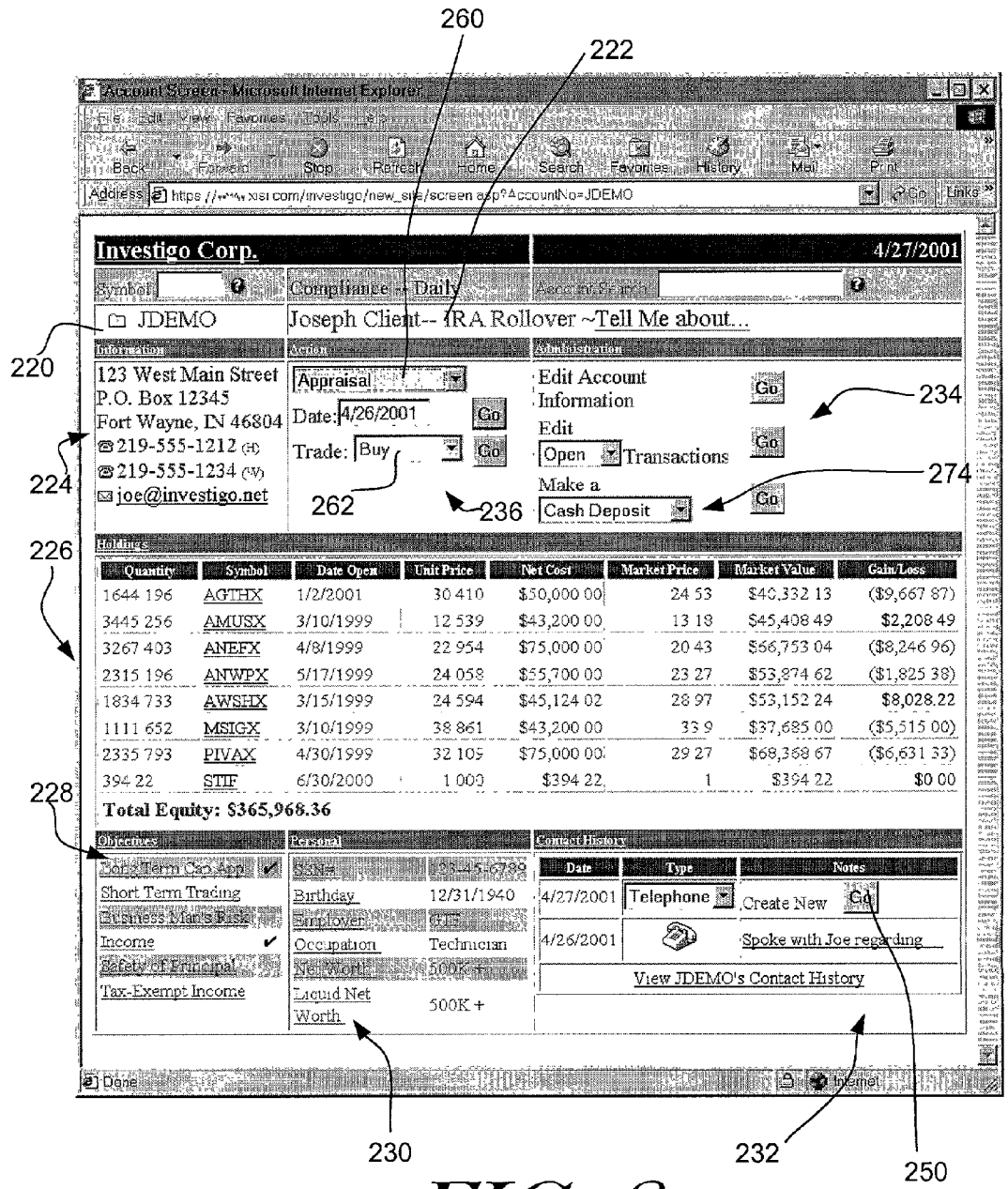
FIG. 8 is a screen shot showing an illustrative window that may be displayed when a representative access a particular customer account of the customer database.

FIG. 8 is a screen shot showing an illustrative window that may be used by a representative to view a customer's account and record his/her daily activities in customer database 30a. The window shows the display after a particular customer account has been selected, namely customer account number "JDEMO". The illustrative window of FIG. 8 identifies the particular account at 220, the customer's name and the type of account at 222, the customer's address, phone number and email address at 224, the holdings in the account at 226, the customer's investment objectives at 228, certain personal information regarding the customer at 230, and recent contact history between the representative and the customer at 232. The window also includes an administrative section 234 and an action section 236, which are further described below.

The holding section 226 identifies the quantity, symbol, date opened, unit price, net cost, market price, market value, and gain/loss for each holding in the account. Also displayed is the total equity for the selected account. The investment objectives section 228 is set by the representative, preferably after having discussions with the customer. The investment objectives of the customer are important to keep in mind, and are thus readily available and viewable by the representative when the customers account is displayed. Often, decisions about future investments and investment strategies are evaluated in view of the customers investment objectives.

The personal information shown at 230 provides the representative with a high level snapshot of the customer and the customer's portfolio. The contact history section 232 is used to record the various contacts or discussions between the representative and the customer. This can be important, particularly during a regulatory audit of the firm. The full contact history between the representative and the customer can be displayed by simply selecting the "View JDEMO's contact history" hyperlink. A new entry in the contact history can be created by simply clicking on the Go button 250.

The administrative section 234 allows the representative to edit account information such as the customer's address or investment objectives. The administrative section 234 also allows the representative to edit an open transaction or to perform a number of tasks that are commonly encountered when dealing with customers, such as making a cash deposit. The action section 236 allows the representative to quickly generate various tables or graphs for the benefit of the customer. The action section 236 also includes a trade menu 262 for performing trades in the selected account. In many cases, the trade menu 262 will be used to record a purchase of a product that is the subject of a marketing project.

Figure 9:
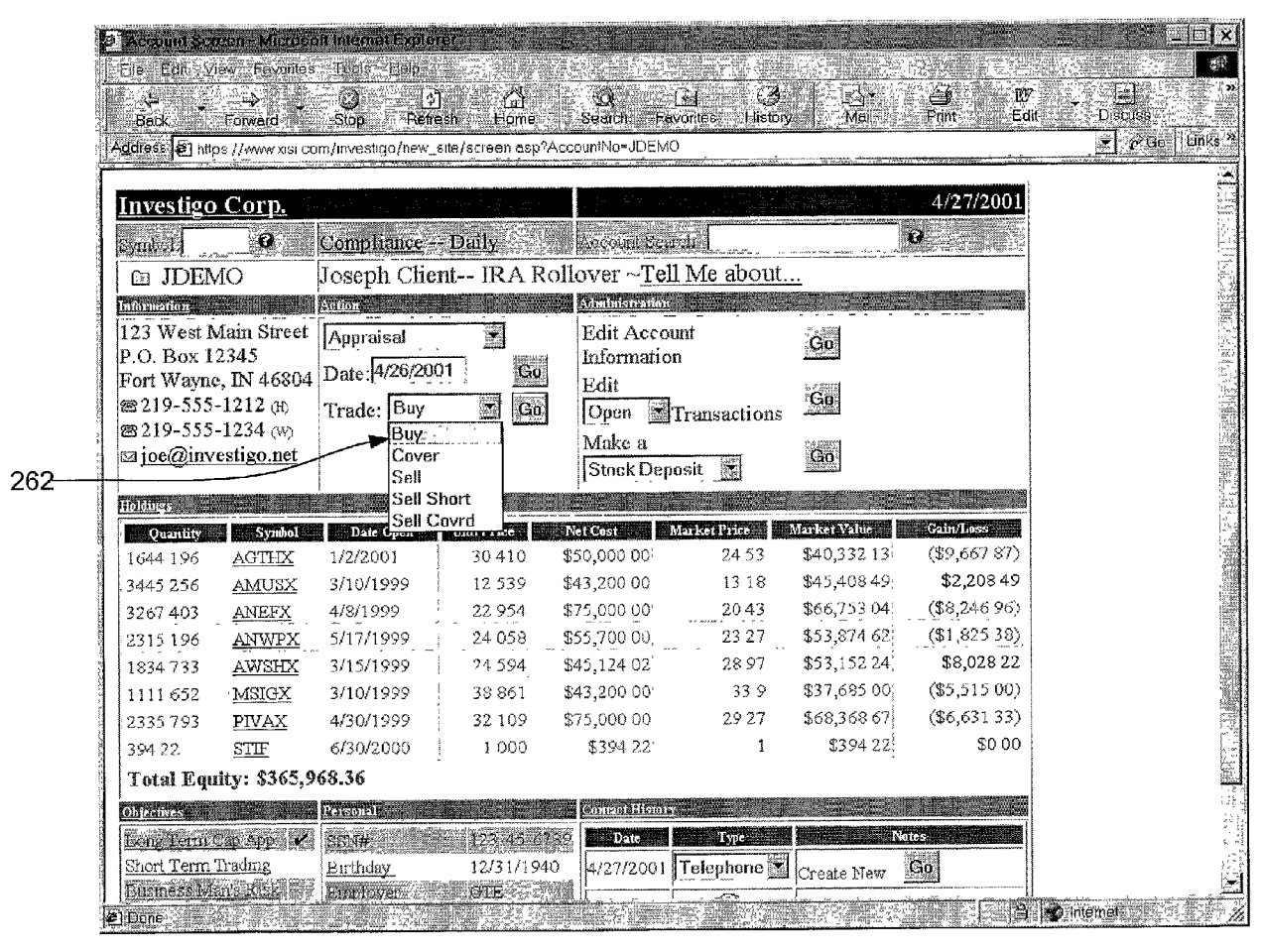
Figure 10:
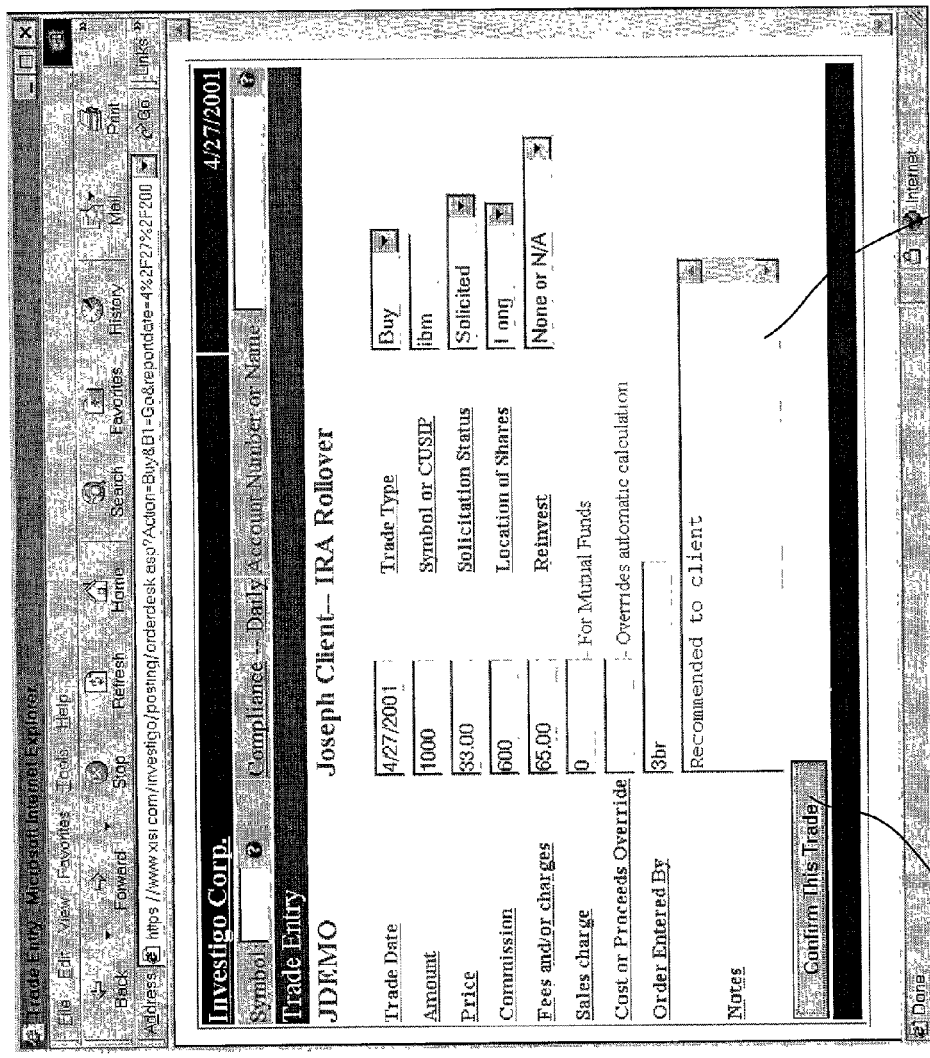
FIG. 10 is a screen shot showing an illustrative window that may be displayed after the "Buy" menu option is selected from the trade menu of FIG. 9.

FIG. 9 is a screen shot showing the window of FIG. 8 with the trade menu 262 expanded. In the illustrative embodiment, the trade menu includes buy, cover, sell, sell short, and sell covered menu options. FIG. 10 is a screen shot of an illustrative window that may be displayed after the "Buy" menu option has been selected from the trade menu 262 of FIG. 9. The window shown in FIG. 10 accepts a number of fields from the representative. In the example shown, the window accepts a trade type, a symbol or CUSIP, a solicitation status, the location of the shares, a trade date, an amount or number or of shares, a price, etc. A notes section 268 is also provided, which allows the representative to record any notes that are pertinent to the trade. Once the representative fills in the appropriate fields, the representative hits the confirm this trade button 270.

Figure 11:
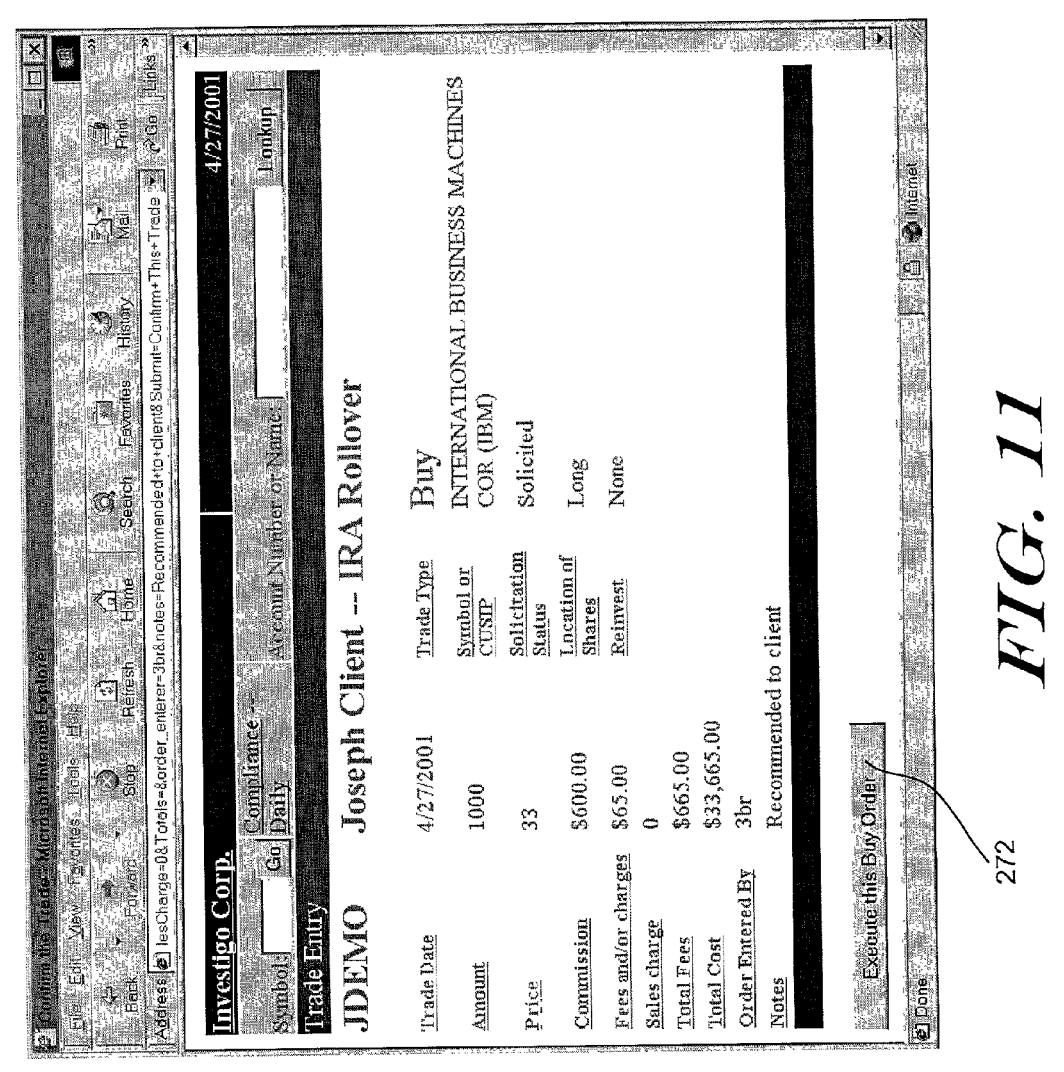

FIG. 11 is a screen shot of an illustrative window that may be displayed after the "Confirm This Trade" button 270 of FIG. 10 has been selected. This window summarizes the information provided by the representative in FIG. 10. The representative reviews the displayed information and executes the order by selecting the "Execute this Buy Order" button 272. When the "Execute this Buy Order" button 272 is selected, the trade is executed and an entry is made in the firm's trade buy blotter 40.

FIG. 12 shows an illustrative Trades Buy Blotter that is preferably maintained by the system for all representatives of a firm. The Trade Buy Blotter includes buys that occurred between Oct. 1, 2000 to Oct. 31, 2000. The illustrative Trade Buy Blotter shows the trade date, the settle date, whether the trade was a buy or sell, the account number corresponding to each trade, the particular product or security that was traded, the number of shares traded, whether the trade was solicited or unsolicited by the representative, the buy price per share, the total buy cost, and the buy commission. Each buy entry shown in FIG. 12 is generated by the system when a representative executes a buy trade using the pull down menu shown in FIG. 9. A further discussion of this system can be found in co-pending U.S. patent application Ser. No. 09/917,120, filed Jul. 27, 2001, entitled "Methods and Systems for Assisting Financial Services Firms and Their Representatives", which is incorporated herein by reference. As can be seen, the system described above with respect to FIGS. 8-12 can be used by a representative to record his/her sales in real or near real time.

Figure 13A:
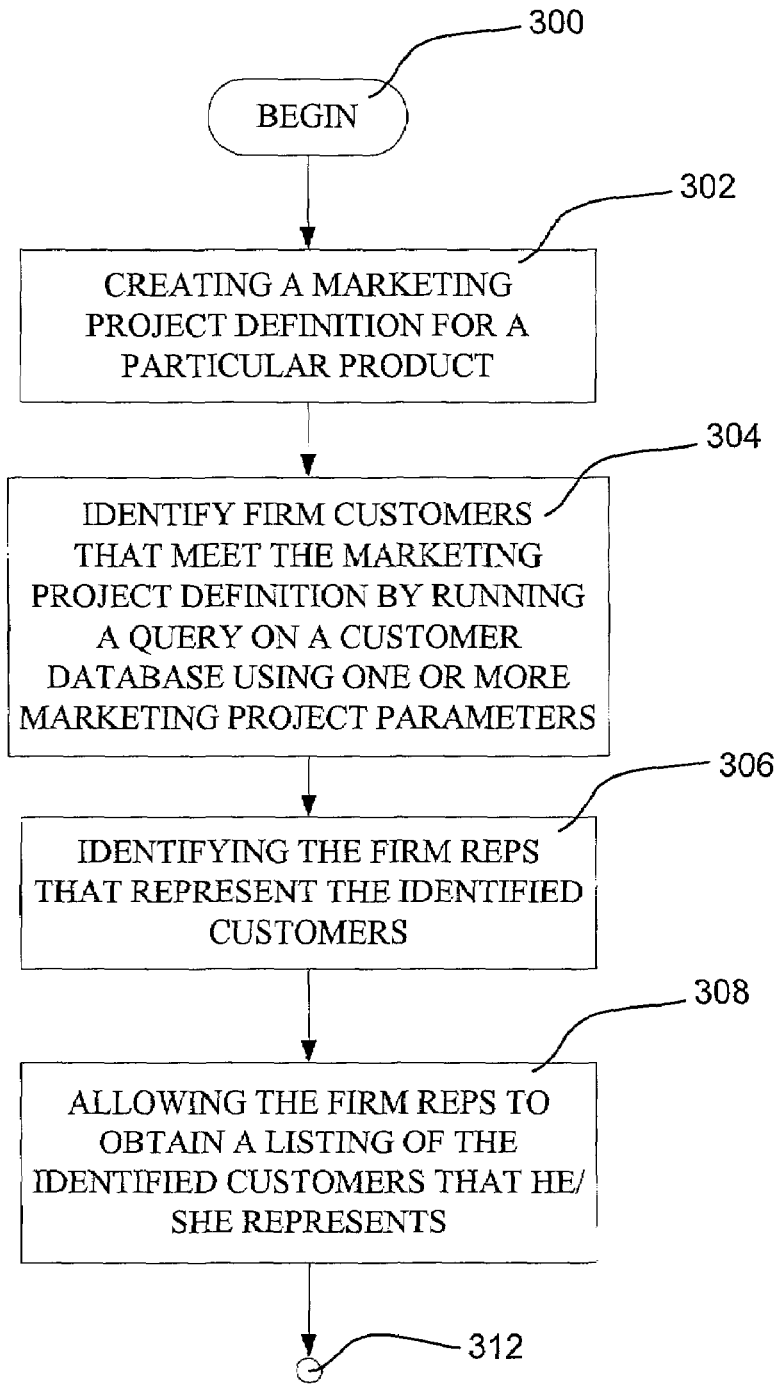
FIGS. 13A-13B show a flow diagram of an illustrative method of the present invention.
Figure 13B:
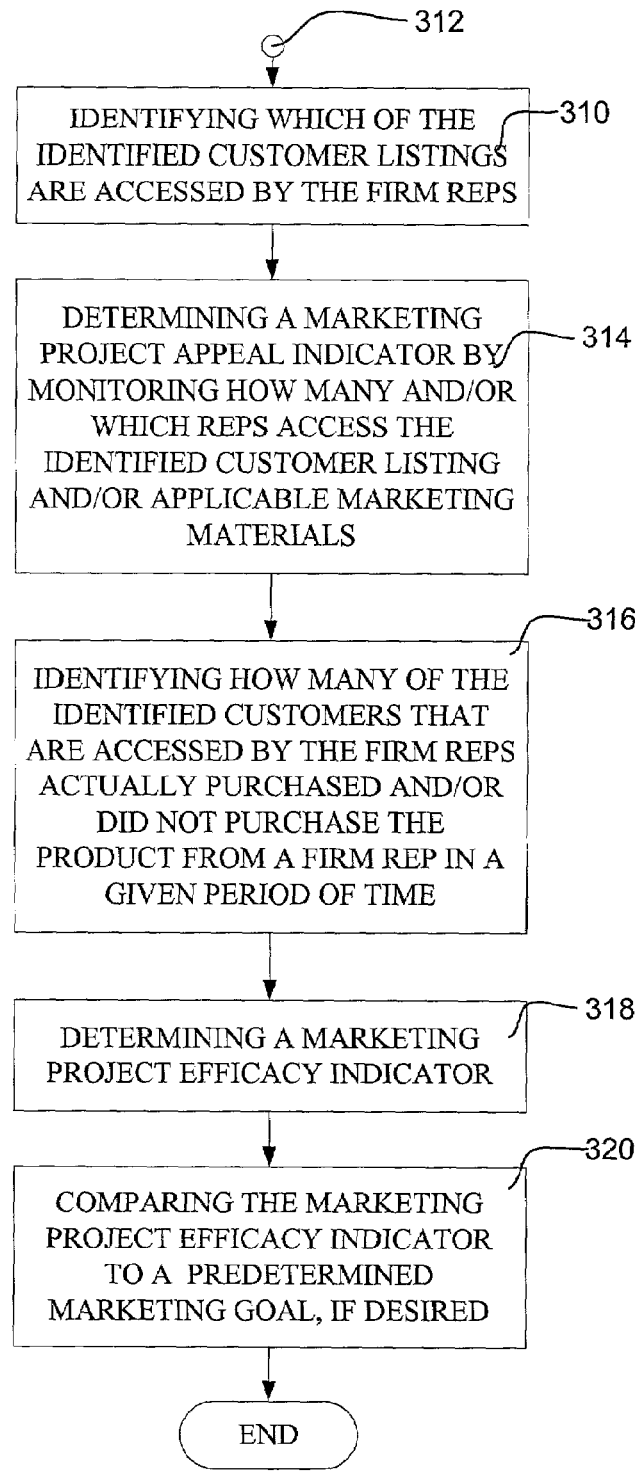

FIGS. 13A-13B show a flow diagram of an illustrative method of the present invention. The illustrative method begins at step 300, and control is passed to step 302. In step 302, a marketing project definition is created for a particular product of interest. Step 304 identifies firm customers that meet the marketing project definition by running one or more queries on a customer database using one or more marketing project parameters. Once the customers are identified, step 306 identifies the firm representatives that represent the identified customers. Step 308 allows those firm representatives to obtain a personalized listing of the identified customers that he/she represents. Step 310 of FIG. 13B identifies which of the identified customer listings are accessed by the firm representatives. Step 314 determines a marketing project appeal indicator by, for example, monitoring how many and/or which representatives access their personalized identified customer listing and/or applicable marketing materials. Alternatively, or in addition, step 314 may determine the project appeal indicator by monitoring how many representatives actually elect to participate in the marketing project.

Step 316 identifies how many and/or which of the identified customers that are accessed by the firm representatives actually purchase the marketed product, preferably within a given period of time. Step 318 determines a marketing project efficacy indicator. Step 318 may determine the marketing project efficacy indicator by, for example, comparing the number of customers that were notified about the product with the number of the same customers that actually purchased or did not purchase the product. Alternatively, or in addition, step 318 may determine the marketing project efficacy indicator by comparing the revenue generated from the sales of the marketed product relative to a revenue goal. Other methods for calculating a marketing project efficacy indicator are also contemplated including, for example, comparing the number of products sold versus a sales goal, comparing the value of the products sold versus a value goal, etc, as shown at step 320.

Figure 14A:
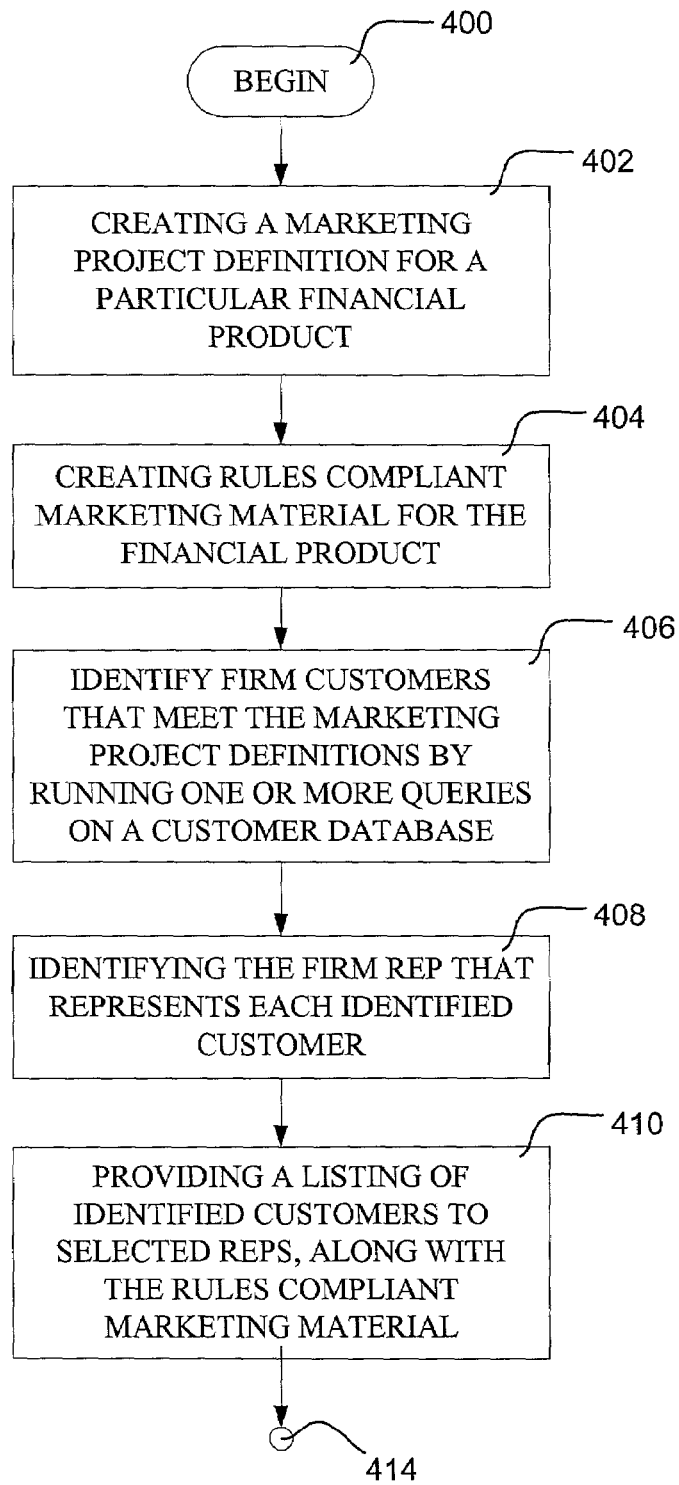
FIGS. 14A-14B show a flow diagram of another illustrative method of the present invention.
Figure 14B:
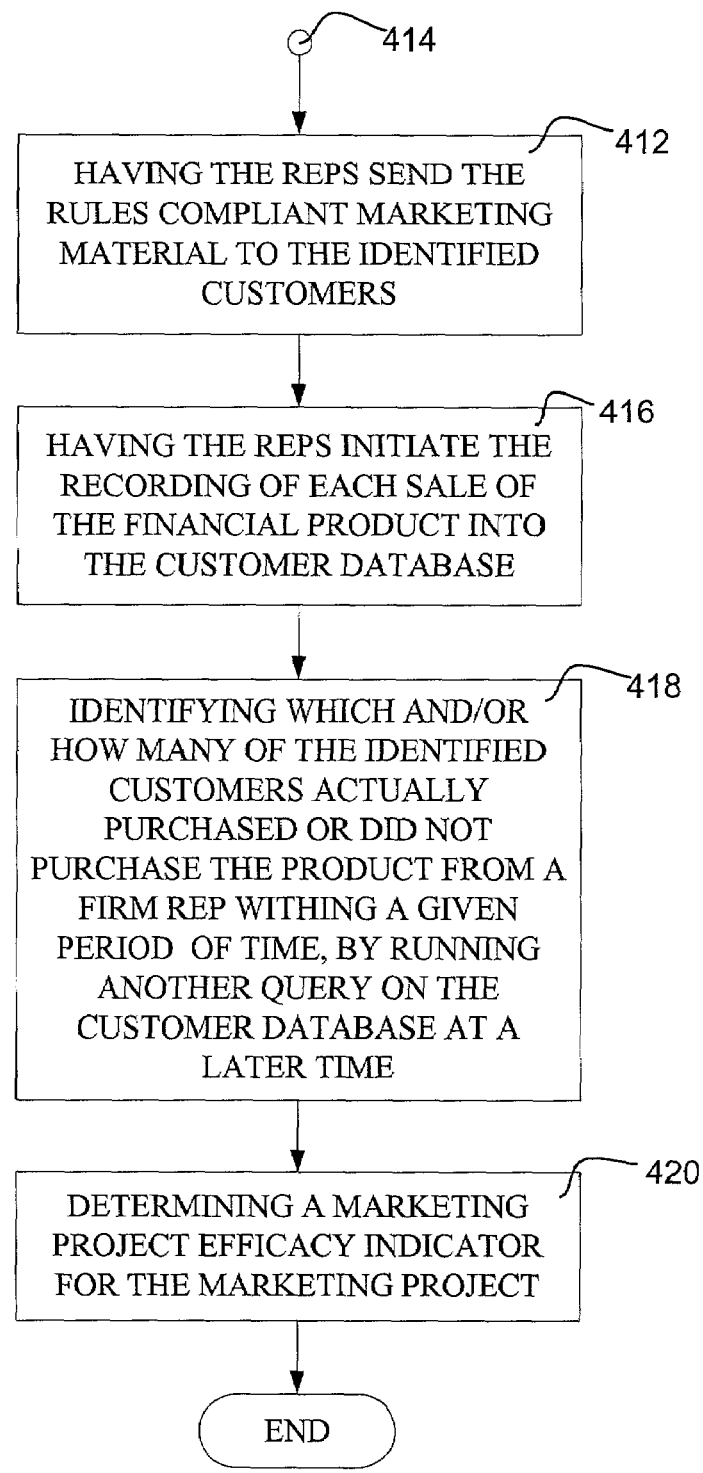

FIGS. 14A-14B show a flow diagram of another illustrative method of the present invention. The illustrative method begins at step 400, and control is passed to step 402. In step 402, a marketing project definition is created for a particular financial product of interest. In step 404, rules compliant marketing material is created for the financial product of interest. Step 406 identifies firm customers that meet the marketing project definition by running one or more queries on a customer database. Once the customers are identified, step 408 identifies the firm representatives that represent the identified customers. Step 410 provides a personalized listing of the identified customers, along with the rules compliant marketing material created in step 404, to selected representatives. In step 412 of FIG. 14B, the representatives sends the rules compliant marketing material to the customers identified on their personalized listing of customers. In step 416, each representative initiates the recording of his/her sales of the financial product in the customer database. The customer database may be the same customer database that is referenced in step 406, or a different database, as desired.

Step 418 identifies how many and/or which of the identified customers actually purchase the marketed product from a firm representative, preferably within a given period of time. Step 418 may be accomplished by running another query on the customer database. Then, step 420 determines a marketing project efficacy indicator for the marking project by, for example, comparing the number of customers that were notified about the product with the number of the same customers that actually purchased or did not purchase the product. Alternatively, or in addition, step 420 may determine a marketing project efficacy indicator by comparing the revenue generated from the sales of the marketed product relative to a revenue goal. Other methods for calculating a marketing project efficacy indicator are also contemplated including, for example, comparing the number of products sold versus a sales goal, comparing the value of the products sold versus a value goal, etc.

Having thus described the preferred embodiments of the present invention, those of skill in the art will readily appreciate that the teachings found herein may be applied to yet other embodiments within the scope of the claims hereto attached.

What is claimed is:

1. A method for monitoring the efficacy of a marketing project for a product of a business, wherein the business has a number of representatives, and each representative represents particular customers of the business, the method comprising the steps of:

providing a customer database for storing information about the customers of the business;

providing a number of marketing project parameters;

applying the number of marketing project parameters against the information in the customer database to identify selected customers;

providing a customized listing of customers to at least selected representatives, wherein each of the customized listings includes a listing of the selected customers that the particular representative represents;

generating marketing material for the marketing project;

providing the marketing material to each of the representatives that receives a customized listing;

at least some of the representatives sending the marketing material to at least some of the selected customers listed in their customized listing, wherein at least part of the marketing material includes textual matter;

determining which or how many of the customers that were sent the marketing material by their representative actually purchased the product; and determining a marketing project efficacy indicator by noting which or how many of the customers that were sent the marketing material by their representative actually purchased the product.

2. A method according to claim 1 wherein the marketing project efficacy indicator is determined by comparing the number of customers that were sent the marketing material by their representative with the number of the customers that were sent the marketing material by their representative and actually purchased the product.

3. A method according to claim 1 wherein the marketing project efficacy indicator is determined by comparing the number of customers that were sent the marketing material by their representative with the number of the customers that were sent the marketing material by their representative and did not purchased the product.

4. A method according to claim 1 further comprising the step of monitoring revenues generated from the purchase of the product by the customers that were sent the marketing material by their representative.

5. A method according to claim 4 wherein the marketing project efficacy indicator is determined by comparing the revenues generated from the sale of the marketed product relative to a revenue goal.

6. A method according to claim 1 wherein the marketing project efficacy indicator is determined by comparing the number of products sold versus a goal.

7. A method according to claim 1 further comprising the steps of;

modifying the marketing material if the marketing project efficacy indicator is deemed to be too low.

8. A method according to claim 1 further comprising the step of:

modifying selected marketing project parameters if the marketing project efficacy indicator is deemed to be too low.

9. A method for marketing a product to customers of a business, wherein the business has a number of representatives, and each representative represents particular customers, the method comprising the steps of:

providing a customer database for storing information about the customers of the business;

providing a number of marketing project parameters;

applying the number of marketing project parameters against the information in the customer database to identify selected customers;

providing a customized listing to at least some of the representatives, each of the customized listings including a portion of the selected customers that are represented by the particular representative;

at least some of the representatives electing to provide marketing material about the product to at least some of their customers listed on their customized listing, wherein the marketing material is personalized to at least appear to be from the representative, wherein at least part of the marketing material includes textual matter.

10. A method according to claim 9 further comprising the steps of:

monitoring how many and/or which of the customers that were provided marketing material about the product actually purchased the product from their representative.

11. A method according to claim 10 further comprising the steps of:

determining a marketing project efficacy indicator for the marketing project by examining which of the customers that were provided with marketing material about the product actually purchased the product.

12. A method according to claim 11 wherein the marketing project efficacy indicator is determined by comparing the number of customers that were provided marketing material with the number of those customers that were provided marketing material that actually purchased the product from a representative of the business.

13. A method according to claim 10 further comprising the step of:

determining common characteristics for those customers that actually purchased the product from a representative of the business.

14. A method according to claim 9 further comprising the steps of:

monitoring how many and/or which of the customers that were provided marketing material about the product did not purchased the product from their representative of the business.

15. A method according to claim 14 further comprising the steps of:

determining a marketing project efficacy indicator for the marketing project by examining which of the customers that were provided with marketing material about the product did not purchase the product.

16. A method according to claim 15 wherein the marketing project efficacy indicator is determined by comparing the number of customers that were provided marketing material with the number of those customers that were provided marketing material that did not purchased the product from a representative of the business.

17. A method according to claim 14 further comprising the step of:

determining common characteristics for those customers that did not purchase the product from a representative of the business.

18. A method according to claim 9 wherein the business is a financial services business, the method further comprising the steps of:

generating the marketing material;

checking the marketing material for compliance with applicable rules and regulations, thereby resulting in compliant marketing material;

providing the compliant marketing material, as well as the customized listing of selected customers, to each of the representatives that received a customized listing.

19. A method according to claim 9, wherein the customized listing of the selected customers is provided to each of the representatives that received a customized listing in a format that is compatible with printing labels.

20. A method according to claim 9, wherein the customized listing of the selected customers is provided to each of the representatives that received a customized listing in a format that is compatible with printing envelopes or post cards.

21. A method according to claim 9, wherein the customized listing of the selected customers is provided to each of the representatives that received a customized listing in a format that is compatible with a merge function of an application program.

22. A method according to claim 9, wherein the customized listing of the selected customers is provided to each of the representatives that received a customized listing in a format that is compatible with a spreadsheet application program.

23. A method according to claim 9, wherein the customized listing of the selected customers is provided to each of the representatives that received a customized listing in a format that is compatible with an e-mail program.

24. A method for marketing a product to customers of a business, wherein the business has a number of representatives, and each representative represents a portion of the customers, the method comprising the steps of:

providing a customer database for storing information about the customers of the business;

providing a marketing project having a number of marketing project parameters;

applying the number of marketing project parameters against the information in the customer database to identify selected customers;

providing a notice announcing the marketing project to one or more of the representatives;

at least some of the representatives reviewing the notice and requesting a customized listing that includes a listing of the portion of the selected customers that are represented by the representative; and determining a marketing project appeal indicator by monitoring how many representatives reviewed the notice and requested a customized listing.

25. A method according to claim 24 wherein the customized listing of selected customers is provided to one or more of the representatives upon initiation by the representative.

26. A method according to claim 24 further comprising the step of:

making a contact entry in the customer database when a representative contacts a customer about the product; and determining a marketing project appeal indicator by monitoring the contact entries in the customer database.

27. A method according to claim 24 wherein the customized listing of the selected customers that is provided to a particular representative only includes customers that the particular representative represents.

28. A method according to claim 24 wherein an identifier for each customer that actually purchased the product is generated by having each representative initiate the recording of each sale of the product in the customer database.

29. A method for marketing a product to customers of a business, wherein the business has a number of representatives, and each representative represents particular ones of the customers of the business, the method comprising the steps of:

generating marketing material, wherein at least part of the marketing material includes textual matter;

checking the marketing material for compliance with applicable rules and regulations, thereby resulting in compliant marketing material;

providing a customer database for storing information about the customers of the business;

providing a number of marketing project parameters;

applying the number of marketing project parameters against the information in the customer database to identify selected customers;

providing the compliant marketing material and a customized listing of the selected customers to at least some of the representatives; and at least some of the representatives providing the compliant marketing material to at least some of the customers listed on their customized listing of selected customers.

30. A method according to claim 29, wherein the rules and regulations are related to a particular product.

31. A method according to claim 29 further comprising the steps of:

monitoring how many and/or which of the customers that were actually provided marketing material about the product actually purchased the product from their representative.

32. A method according to claim 31 further comprising the steps of:

determining a marketing project efficacy indicator for the marketing project by comparing the number of customers that were actually provided marketing material with the number of those customers that were actually provided marketing material that actually purchased the product from their representative.

33. A method according to claim 31 further comprising the step of:

determining common characteristics for those customers that actually purchased the product from their representative.

34. A method for monitoring the efficacy of a marketing project for a product of a business, wherein the business has a number of representatives, each representative represents particular customers of the business, and the customers of one representative are only represented by that representative, the method comprising the steps of:

providing a customer database for storing information about the customers of the business;

providing a number of marketing project parameters;

applying the number of marketing project parameters against the information in the customer database to identify selected customers;

providing a customized listing of customers to at least selected representatives, wherein each of the customized listings includes a listing of the selected customers that the particular representative represents, wherein customers are represented by a single representative;

generating marketing material for the marketing project;

providing the marketing material to each of the representatives that receives a customized listing;

at least some of the representatives sending the marketing material to at least some of the selected customers listed in their customized listing;

determining which or how many of the customers that were sent the marketing material by their representative actually purchased the product; and determining a marketing project efficacy indicator by noting which or how many of the customers that were sent the marketing material by their representative actually purchased the product.

* * * * *